US012664086B2

(12) United States Patent
Tian et al.

(10) Patent No.: US 12,664,086 B2
(45) Date of Patent: Jun. 23, 2026

(54) HYBRID BLOCK MANAGEMENT WITH DYNAMIC SLC VERIFY

(71) Applicant: Sandisk Technologies, Inc., Milpitas, CA (US)

(72) Inventors: Xuan Tian, Shanghai (CN); Liang Li, Shanghai (CN); Vincent Yin, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 147 days.

(21) Appl. No.: 18/771,651

(22) Filed: Jul. 12, 2024

(65) Prior Publication Data

US 2026/0017186 A1     Jan. 15, 2026

(51) Int. Cl.
*G06F 12/02*          (2006.01)

(52) U.S. Cl.
CPC .. *G06F 12/0246* (2013.01); *G06F 2212/7201* (2013.01)

(58) Field of Classification Search
CPC ................................................... G06F 12/0246
See application file for complete search history.

(56) References Cited

U.S. PATENT DOCUMENTS

| | | | |
|---|---|---|---|
| 8,886,990 | B2 | 11/2014 | Meir et al. |
| 9,146,851 | B2 | 9/2015 | Pittelko |
| 9,501,400 | B2 | 11/2016 | Yeung et al. |
| 11,347,403 | B2 | 5/2022 | Mehta et al. |
| 11,934,675 | B2 | 3/2024 | Agarwal et al. |
| 2010/0142284 | A1 | 6/2010 | Bathul et al. |
| 2012/0069674 | A1 | 3/2012 | Lee |
| 2014/0298088 | A1 | 10/2014 | Radke et al. |
| 2018/0293001 | A1 | 10/2018 | Muchherla et al. |
| 2018/0373584 | A1 * | 12/2018 | Huang .................. G06F 11/102 |
| 2019/0265888 | A1 * | 8/2019 | Yang .................. G11C 11/5671 |
| 2019/0385680 | A1 | 12/2019 | Dunga et al. |
| 2023/0066972 | A1 | 3/2023 | Lien et al. |
| 2023/0368846 | A1 | 11/2023 | Guo et al. |
| 2024/0055060 | A1 | 2/2024 | Lien et al. |

OTHER PUBLICATIONS

International Search Report & The Written Opinion of the International Searching Authority dated Jul. 30, 2025, International Application No. PCT/US2025/025664.

* cited by examiner

*Primary Examiner* — Amir Zarabian
*Assistant Examiner* — Anthony Thinh Tang
(74) *Attorney, Agent, or Firm* — Pearl Cohen Zedek Latzer Baratz LLP

(57)          ABSTRACT

Technology for hybrid block management for dynamic SLC verify. The memory system tracks multi-level cell (MLC) programming speed of candidate pages in a three-dimensional NAND memory structure. The memory system determines whether each respective candidate page is eligible for single-level cell (SLC) programming without program verify based on the MLC programming speed. The memory system then programs the candidate pages based on the determination. The memory system may maintain a bitmap that specifies whether a particular candidate page is to receive program verify or not for SLC programming. In one aspect, the MLC programming speed is tracked by noting the number of program pulses used to complete MLC programming.

16 Claims, 19 Drawing Sheets

FIG. 1
(Conventional Art)

| WL | SB0 | SB1 | SB2 | SB3 |
|---|---|---|---|---|
| Top | 1 | 1 | 1 | 1 |
| Top | 0 | 0 | 0 | 0 |
| Top | 1 | 1 | 1 | 1 |
| Top | 0 | 0 | 0 | 0 |
| ... | ... | ... | ... | ... |
| Mid-tier | 0 | 0 | 0 | 1 |
| Mid-tier | 0 | 0 | 1 | 0 |
| Mid-tier | 0 | 1 | 0 | 0 |
| Mid-tier | 1 | 0 | 0 | 0 |
| ... | ... | ... | ... | ... |
| Joint | 1 | 1 | 1 | 1 |
| Joint | 1 | 1 | 1 | 1 |
| ... | ... | ... | ... | ... |
| Mid-tier | 0 | 0 | 0 | 1 |
| Mid-tier | 0 | 0 | 1 | 0 |
| Mid-tier | 0 | 1 | 0 | 0 |
| Mid-tier | 1 | 0 | 0 | 0 |
| ... | ... | ... | ... | ... |
| Bottom | 1 | 1 | 1 | 1 |
| Bottom | 1 | 1 | 1 | 1 |
| Bottom | 1 | 1 | 1 | 1 |
| Bottom | 1 | 1 | 1 | 1 |

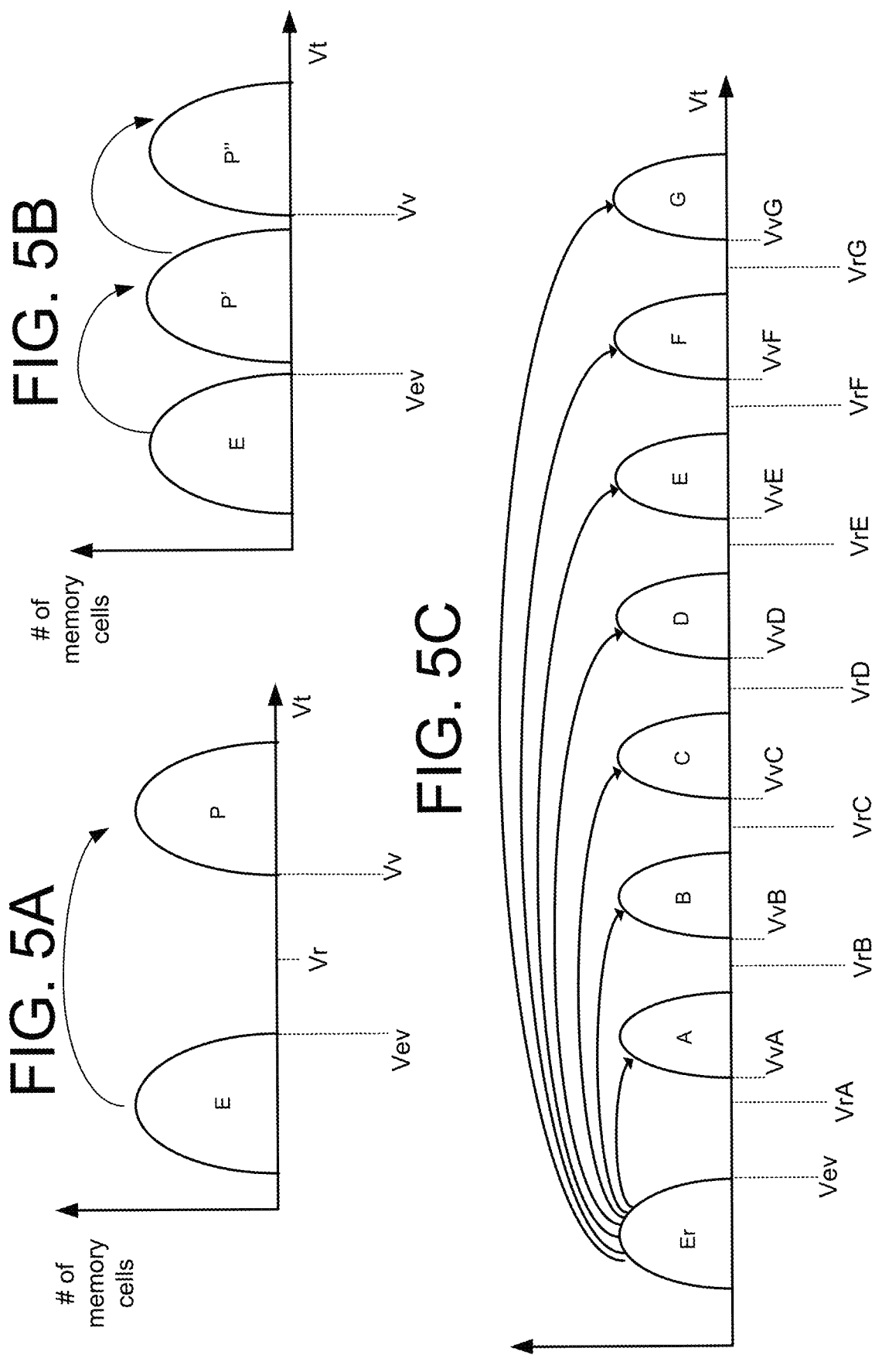

FIG. 9

| WL | SB0 | SB1 | SB2 | SB3 |
|---|---|---|---|---|
| Top | H | H | H | H |
| Top | L | L | L | L |
| Top | M | M | M | M |
| Top | L | L | L | L |
| ... | ... | ... | ... | ... |
| Mid-tier | L | L | L | L |
| Mid-tier | M | M | M | M |
| Mid-tier | L | L | L | L |
| Mid-tier | L | L | L | L |
| ... | ... | ... | ... | ... |
| Joint | M | M | M | M |
| Joint | M | M | M | M |
| ... | ... | ... | ... | ... |
| Mid-tier | L | L | L | L |
| Mid-tier | L | L | L | L |
| Mid-tier | L | M | M | M |
| Mid-tier | L | L | L | L |
| ... | ... | ... | ... | ... |
| Bottom | M | L | M | L |
| Bottom | M | M | M | M |
| Bottom | H | H | H | H |
| Bottom | H | H | H | H |

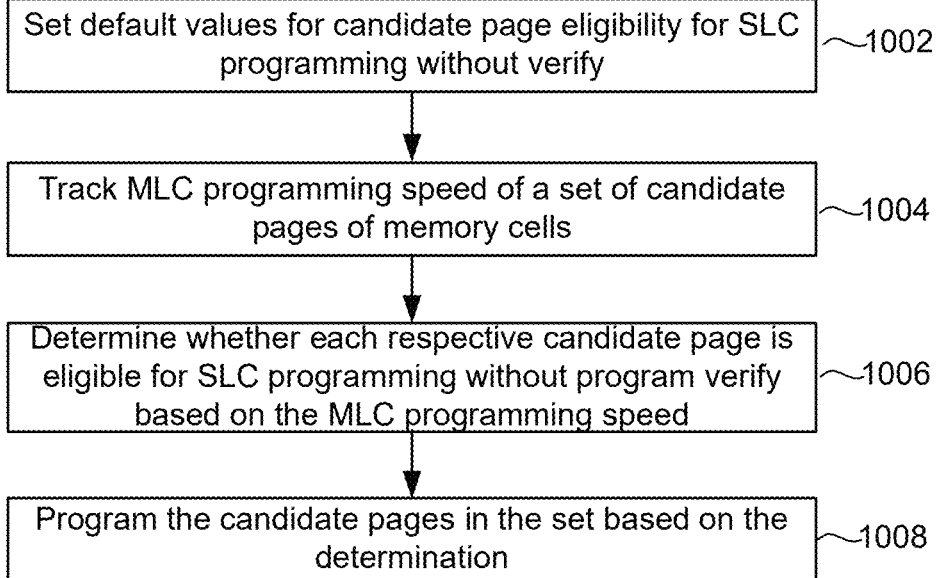

1000

Set default values for candidate page eligibility for SLC programming without verify ~1002

Track MLC programming speed of a set of candidate pages of memory cells ~1004

Determine whether each respective candidate page is eligible for SLC programming without program verify based on the MLC programming speed ~1006

Program the candidate pages in the set based on the determination ~1008

FIG. 11

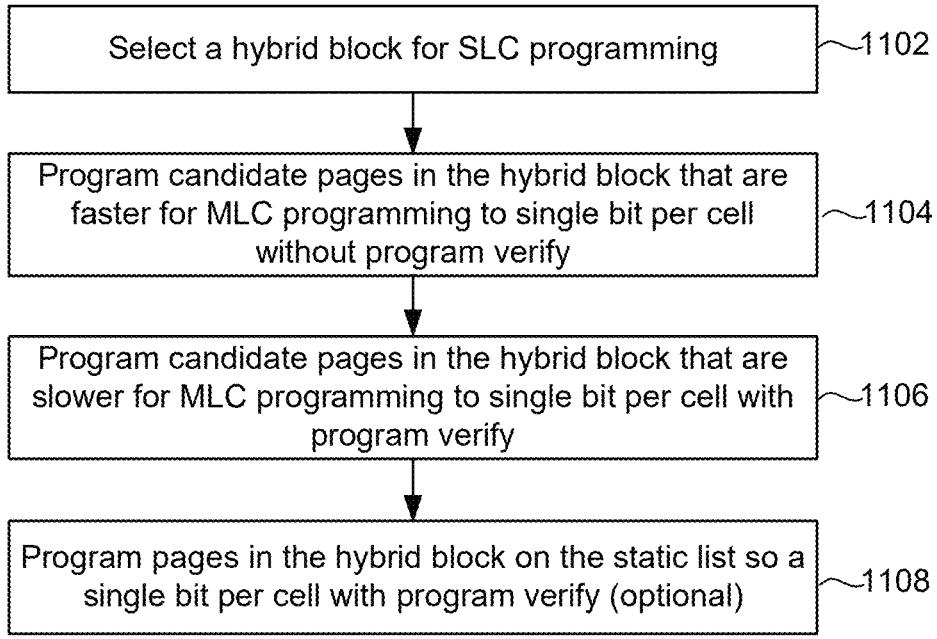

1100

Select a hybrid block for SLC programming ~1102

Program candidate pages in the hybrid block that are faster for MLC programming to single bit per cell without program verify ~1104

Program candidate pages in the hybrid block that are slower for MLC programming to single bit per cell with program verify ~1106

Program pages in the hybrid block on the static list so a single bit per cell with program verify (optional) ~1108

Place blocks having at least a threshold number of slow to MLC program candidate pages into a first pool of blocks that are eligible for MLC programming but are not eligible for SLC programming ~1202

Keep blocks having less than the threshold number of slow to MLC program candidate pages in a second pool of blocks that are eligible for both MLC programming and SLC programming ~1204

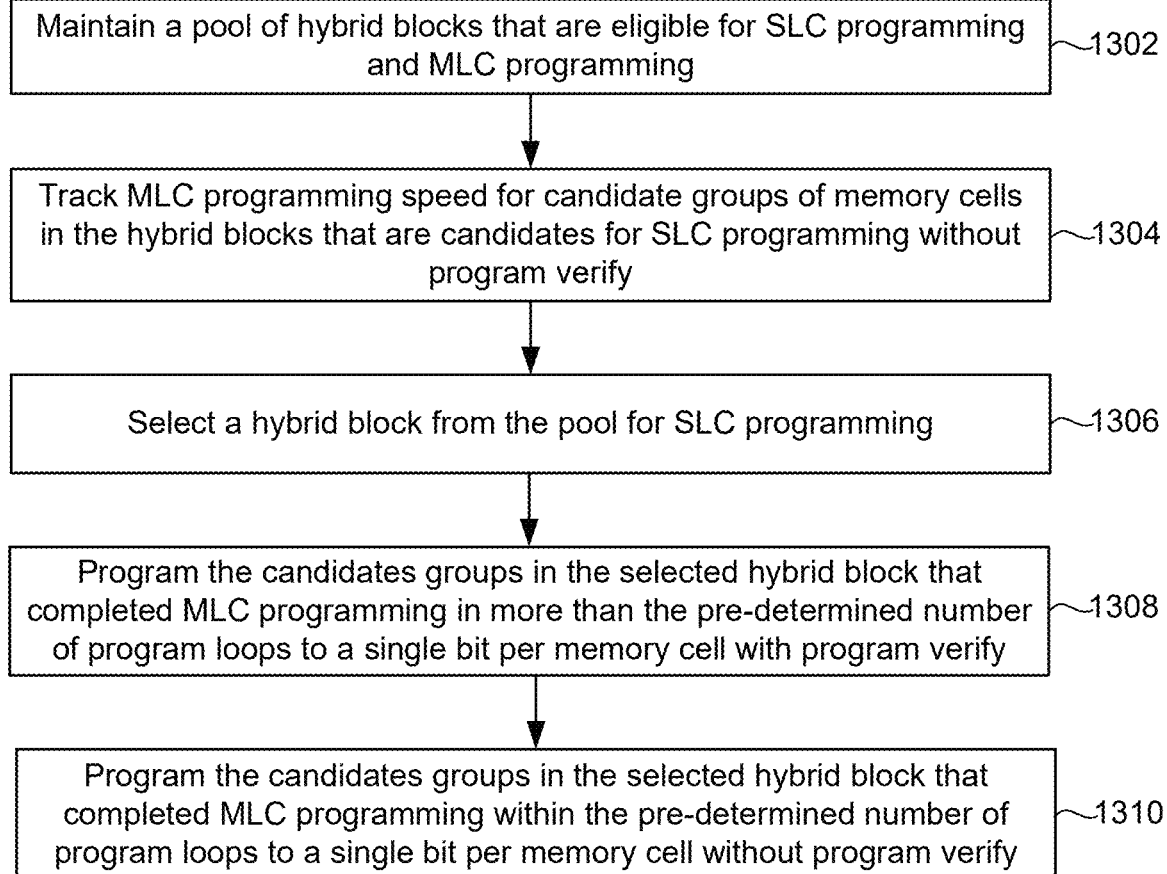

Maintain a pool of hybrid blocks that are eligible for SLC programming and MLC programming ~1302

Track MLC programming speed for candidate groups of memory cells in the hybrid blocks that are candidates for SLC programming without program verify ~1304

Select a hybrid block from the pool for SLC programming ~1306

Program the candidates groups in the selected hybrid block that completed MLC programming in more than the pre-determined number of program loops to a single bit per memory cell with program verify ~1308

Program the candidates groups in the selected hybrid block that completed MLC programming within the pre-determined number of program loops to a single bit per memory cell without program verify ~1310

HYBRID BLOCK MANAGEMENT WITH DYNAMIC SLC VERIFY

BACKGROUND

The present disclosure relates to technology for non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. Herein, a memory system that uses non-volatile memory for storage may be referred to as a storage system. The memory structure may be three-dimensional (3D). One type of 3D structure has non-volatile memory cells arranged as vertical NAND strings. The 3D memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the block.

For memory such as NAND, a large set of memory cells are erased prior to programming. After erasing, the memory cells are programmed one unit at a time. A group of memory cells that are programmed as a unit may be referred to as a page of memory cells. The non-volatile memory cells may be programmed to store data. Typically, the memory cells are programmed to a number of data states. Using two data states to store a single bit per cell is referred to herein as single level cell ("SLC") programming. Using a greater number of data states allows for more bits to be stored per memory cell. Using additional data states to store two or more bits per cell is referred to herein as multi-level cell ("MLC") programming. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell. Each data state may be associated with a unique Vt distribution.

In one technique, the memory system manages the blocks of NAND memory cells by designating each block as one of an SLC block, an MLC block, or a hybrid block. An SLC block is a block of NAND memory cells that is eligible for only SLC programming. An MLC block is a block of NAND memory cells that is eligible for only NLC programming. A hybrid block is a block of NAND memory cells that is eligible for either MLC programming or for SLC programming.

For MLC programming of NAND cells after a program pulse is applied to the memory cells there typically is a verification step to determine whether the memory cells have reached their respective target Vts. Verification adds to the programming time; therefore, the memory system may skip the verification for memory cells whose target Vt is not expected to be reached by the most recent program pulse. Verification also draws current from a power source and hence consumes power.

For SLC programming of NAND cells one option is to verify whether the memory cells to be programmed have reached the target Vt after a program pulse. However, to save time one technique is to simply apply one program pulse without any verification. Although such a no verify technique for SLC programming of NAND cells saves time, current and power; skipping verify has a risk of under-programmed memory cells.

One possible technique is to always verify certain pages in a block when SLC programming and to never verify the remaining pages in the block. The pages to be verified for SLC programming are based on the physical location of the pages within the block. Other pages in the block are not verified when SLC programming. FIG. 1 is a table that illustrates one conventional example of a static list of which pages to verify and which pages to not verify when SLC programming based on the physical location of the pages. Column 2 indicates the relative location of the word line (WL) within a block. Examples for word lines at the top of the stack, mid-tier, adjacent to the joint between tiers, and bottom of the stack are listed. There are four pages of memory cells per word line in this example, corresponding to the four sub-blocks (SB0, SB1, SB2, SB3). The sub-block (SB) columns 4, 6, 8, 10 contain example bit values that specify whether SLC program verify is to be performed or not for a page at that location within the block. In this example, a bit value of "1" indicates that verify is to be performed for SLC programming of that page. A bit value of "0" indicates that verify is not to be performed for SLC programming of that page. Skipping program verify will save programming time, but has a risk of a high fail bit count. If the fail bit count is too high, then a page fail occurs. In the example in FIG. 1, pages on the bottom word lines and joint word lines are always verified during SLC programming. In this example, pages on some of the top word lines are always verified during SLC programming. Additionally, some pages in the mid-tier are verified during SLC programming. The mid-tier pages that are verified could be a pattern such as one page per word line, all or a subset of pages on every x word lines (x being an integer greater than 1), etc. This more or less random selection at mid-tier could result in verifying pages that do not need verify for SLC programming, which slows programming speed and consumes additional current and power. Also, the pattern in FIG. 1 could miss pages that do need verify for SLC programming. Moreover, the pattern in FIG. 1 is the same for all blocks. Therefore, any block-to-block variation is not accounted for.

BRIEF DESCRIPTION OF THE DRAWINGS

Like-numbered elements refer to common components in the different figures.

FIG. 1 is a table that illustrates one conventional example of how a static list of may be formed based on the location of the pages.

FIG. 4 is a perspective view of a portion of one example embodiment of a monolithic three dimensional memory structure.

FIG. 5A depicts SLC threshold voltage distributions.

FIG. 5B depicts an example in which it takes two programming pulses to program cells from the erase state to the programmed state.

FIGS. 5C and 6 depict MLC threshold voltage distributions.

FIG. 9 is a table showing an example of relative fail bit counts for the pages in a block assuming SLC programming is performed without verify.

FIG. 10 is a flowchart of one embodiment of a process of operating three-dimensional NAND memory.

FIG. 11 is a flowchart of one embodiment of a process of SLC programming wherein program verify depends on MLC programming speed.

FIG. 12 is a flowchart of one embodiment of a process of managing pools of blocks based on MLC programming speed.

FIG. 13 is a flowchart of one embodiment of a process of operating NAND memory.

DETAILED DESCRIPTION

Figure 2A:
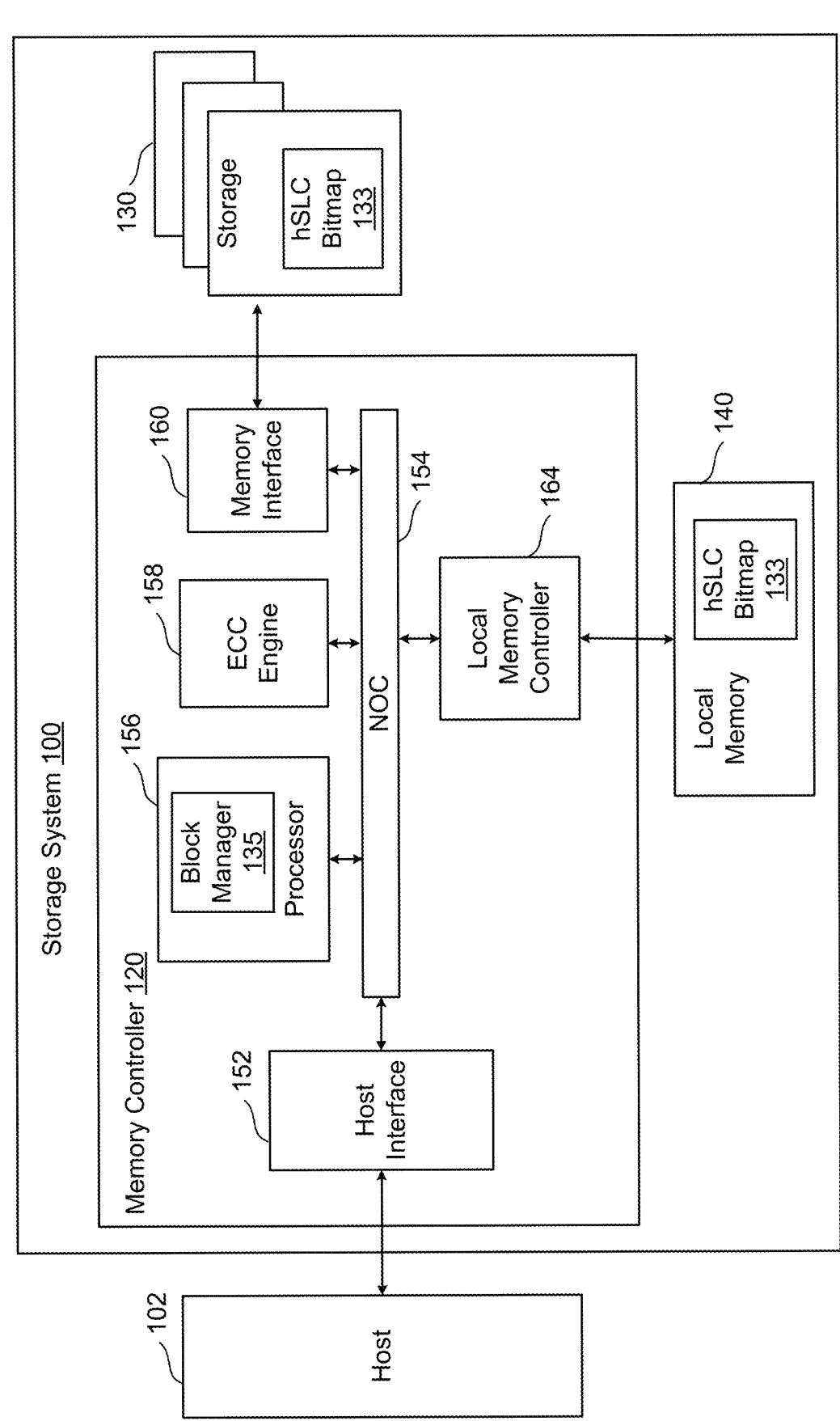
FIG. 2A is a block diagram depicting one embodiment of a memory system.

Technology is disclosed for hybrid block management for dynamic SLC verify. The phrase "dynamic SLC verify" means that whether or not a particular page of NAND memory cells is verified during SLC programming can change over time. In an embodiment, the memory system tracks multi-level cell (MLC) programming speed of candidate page in a three-dimensional NAND memory structure. The candidate pages are candidates for single-level cell (SLC) programming without program verify. The memory system determines whether each respective candidate page is eligible for single-level cell (SLC) programming without program verify based on the MLC programming speed. The memory system then programs the candidate pages based on the determination. The candidate pages that are tracked may be within hybrid blocks that are eligible for either MLC programming or SLC programming. The candidate pages that are tracked may be a subset of that pages in the hybrid blocks that are good candidates for SLC programming without verify. The SLC programming without verify may apply a single program pulse and therefore be referred to as 1P0V (one program pulse, zero verify pulses). The memory system may maintain a bitmap that specifies whether a particular candidate page is to receive program verify or not for SLC programming.

Programming speed refers to the amount of Vt shift (e.g., increase) that occurs to a NAND memory cell in response to a program pulse. Slower to program NAND memory cells may need more program pulses to reach a target Vt. In one embodiment, the MLC programming speed is tracked by noting the number of program pulses used to complete MLC programming. The programming speed may be impacted by physical characteristics such as, but not limited to, leakage current. Leakage current during programming can slow the rate of programming. It may be that pages in certain physical regions of the block are more susceptible to issues that impact programming speed such as, but not limited to, leakage current. However, any page in the block may suffer from issues that impact programming speed such as, but not limited to, leakage current. Moreover, there may be block to block variance in such physical characteristics. Tracking the MLC programming speed of a candidate page is an accurate technique for determining whether verify can be skipped when SLC programming the candidate page.

In one aspect, pages within the hybrid blocks that are not good candidates for SLC programming without verify are not tracked for MLC programming speed, wherein verify is always performed when SLC programming. The memory system may store a static list of pages addresses that are not good candidates for SLC programming without verify. These page addresses may correspond to physical locations in a block that are susceptible to SLC programming issues, such as slower SLC programming. Therefore, this static list of page addresses may be applied in the same manner to each block that undergoes SLC programming.

An embodiment of a memory system with hybrid block management for dynamic SLC verify identifies the candidate pages that benefit from program verify when SLC programming and avoids unnecessary program verify when SLC programming the candidate pages. An embodiment of a memory system with hybrid block management for dynamic SLC verify accounts for block-to-block variations in the SLC programming of the candidate pages.

FIG. 2A is a block diagram of one embodiment of a memory system 100 that implements the technology described herein. In one embodiment, memory system 100 is a solid state drive ("SSD"). Memory system 100 can also be a memory card, USB drive or other type of memory system. The proposed technology is not limited to any one type of memory system. Memory system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, memory system 100. In other embodiments, memory system 100 is embedded within host 102.

The components of memory system 100 depicted in FIG. 2A are electrical circuits. Memory system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store (or cache) logical to physical address translation tables ("L2P tables").

The local high speed memory 140 may cache an hSLC bitmap 133. The hSLC bitmap 133 may be used to determine whether to perform a verify operation for SLC programming of a group of memory cells in the storage 130. The storage system 100 may track MLC programming speed of candidate groups of memory cells. The candidate groups are groups, such as a page of NAND memory cells, which are candidates for SLC programming without program verify. The candidate groups (e.g., pages) that meet an MLC programming speed criterion are eligible for SLC programming without program verify. However, the candidate groups that do not meet the MLC programming speed criterion are not eligible for SLC programming without program verify. In an embodiment, such slower MLC programming groups may receive SLC programming with program verify. The memory controller 120 may update the hSLC bitmap 133 following an MLC programming operation, if needed. A persistent version of the hSLC bitmap 133 may be stored in storage 130. The version of the hSLC bitmap 133 in the local memory 140 may be a portion of the persistent version.

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations such as programming, erasing, reading, and memory management processes. In one embodiment, processor 156 is programmed by firmware. In other embodiments, processor 156 is a custom and dedicated hardware circuit without any software. Processor 156 may also implement a translation module, as a software/firmware process or as a dedicated hardware circuit. In many systems, the non-volatile memory is addressed internally to the memory system using physical addresses associated with the one or more memory die. However, the host system will use logical addresses to address the various memory locations. This enables the host to assign data to consecutive logical addresses, while the memory system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a memory system is so large that the local memory 140 cannot hold all of the L2P tables. In such a case, the entire set of L2P tables are stored in a storage 130 and a subset of the L2P tables are cached (L2P cache) in the local high speed memory 140.

An embodiment of the processor 156 includes a block manager 135, which manages blocks of NAND memory cells in the storage 130. The block manager 135 may maintain the hSLC bitmap 133. In an embodiment, control circuitry in the storage 130 reports MLC programming speed to the memory controller 120, wherein the block manager 135 may update the hSLC bitmap 133 based on the MLC programming speed. However, another option is for control circuitry in the storage 130 to update the hSLC bitmap 133 in storage 133 based on the MLC programming speed. The block manager 135 may maintain a list of hybrid blocks eligible for both SLC programming and MLC programming. The block manager 135 may also maintain a list of SLC blocks eligible for only SLC programming and a list of blocks eligible for only MLC programming. When the memory controller 120 instructs the storage 130 to SLC program a group of cells the memory controller 120 may add a pre-fix or the like to the instruction to indicate that program verify is not to be performed for this group. The pre-fix may be, for example, a vendor specific code in an interface specification such as, but not limited to, the Open NAND Flash Interface (ONFI).

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2B:
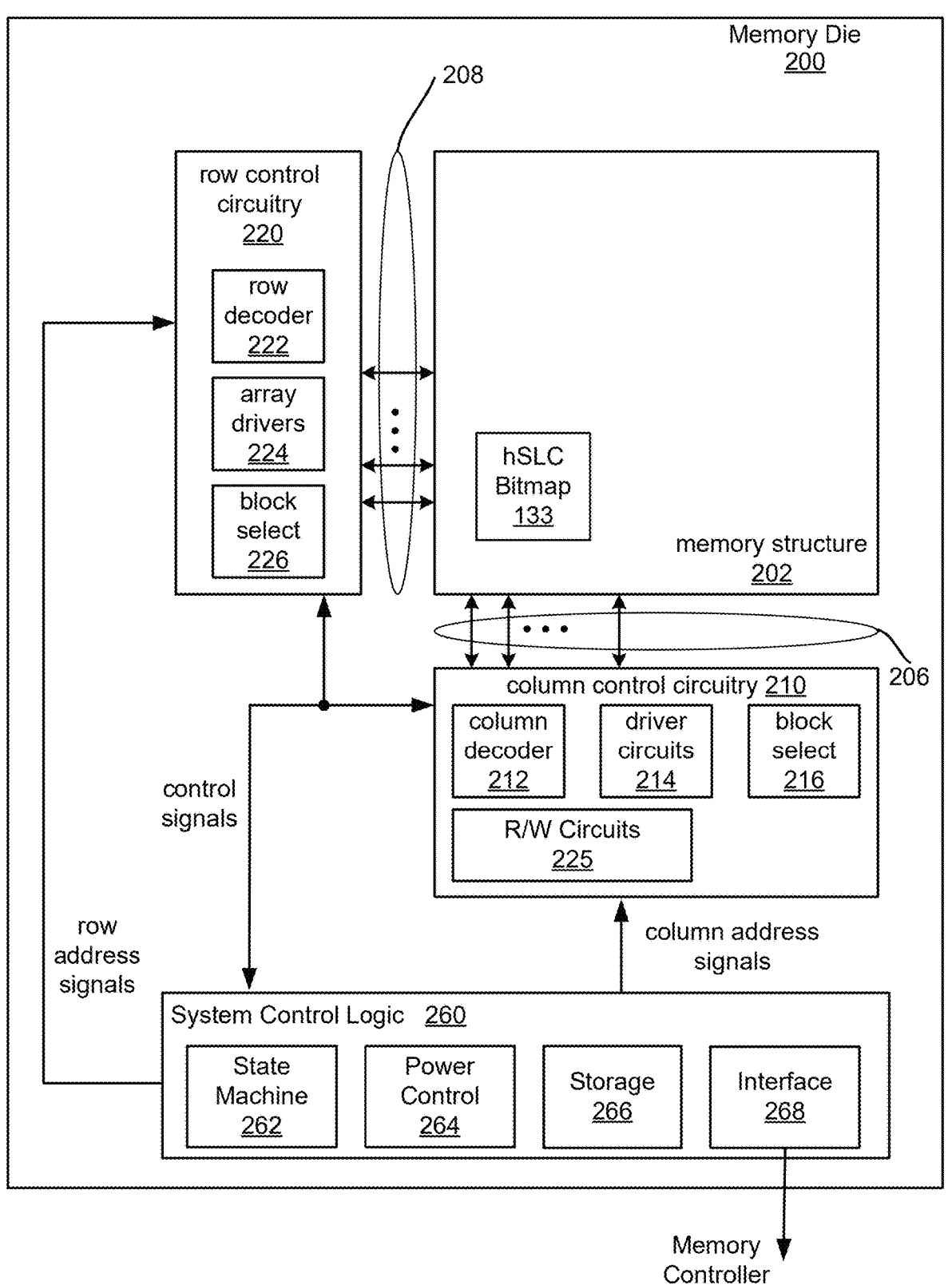
FIG. 2B is a block diagram of one embodiment of a memory die.

In one embodiment, non-volatile storage 130 comprises one or more memory dies. FIG. 2B is a functional block diagram of one embodiment of a memory die 200 that comprises non-volatile storage 130. Each of the one or more memory dies of non-volatile storage 130 can be implemented as memory die 200 of FIG. 2B. The components depicted in FIG. 2B are electrical circuits. Memory die 200 includes a memory structure 202 (e.g., memory array) that can comprise non-volatile memory cells (also referred to as non-volatile storage cells), as described in more detail below.

The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers. The system control logic 260, column control circuitry 210, and/or row control circuitry 220 are configured to control memory operations such as open block reads at the die level.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202. The memory structure 202 may store a persistent version of the hSLC bitmap 133. In one embodiment, the hSLC bitmap 133 in storage 130 may be updated by either the system control logic 260 or the memory controller 120. In one embodiment, only the system control logic 260 updates the hSLC bitmap 133. In one embodiment, only the memory controller 120 updates the hSLC bitmap 133.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2B can be grouped into two parts: (1) memory structure 202 and (2) peripheral circuitry, which includes all of the other components depicted in FIG. 2B. An important characteristic of a memory circuit is its capacity, which can be increased by increasing the area of the memory die of memory system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the memory system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2B onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2C:
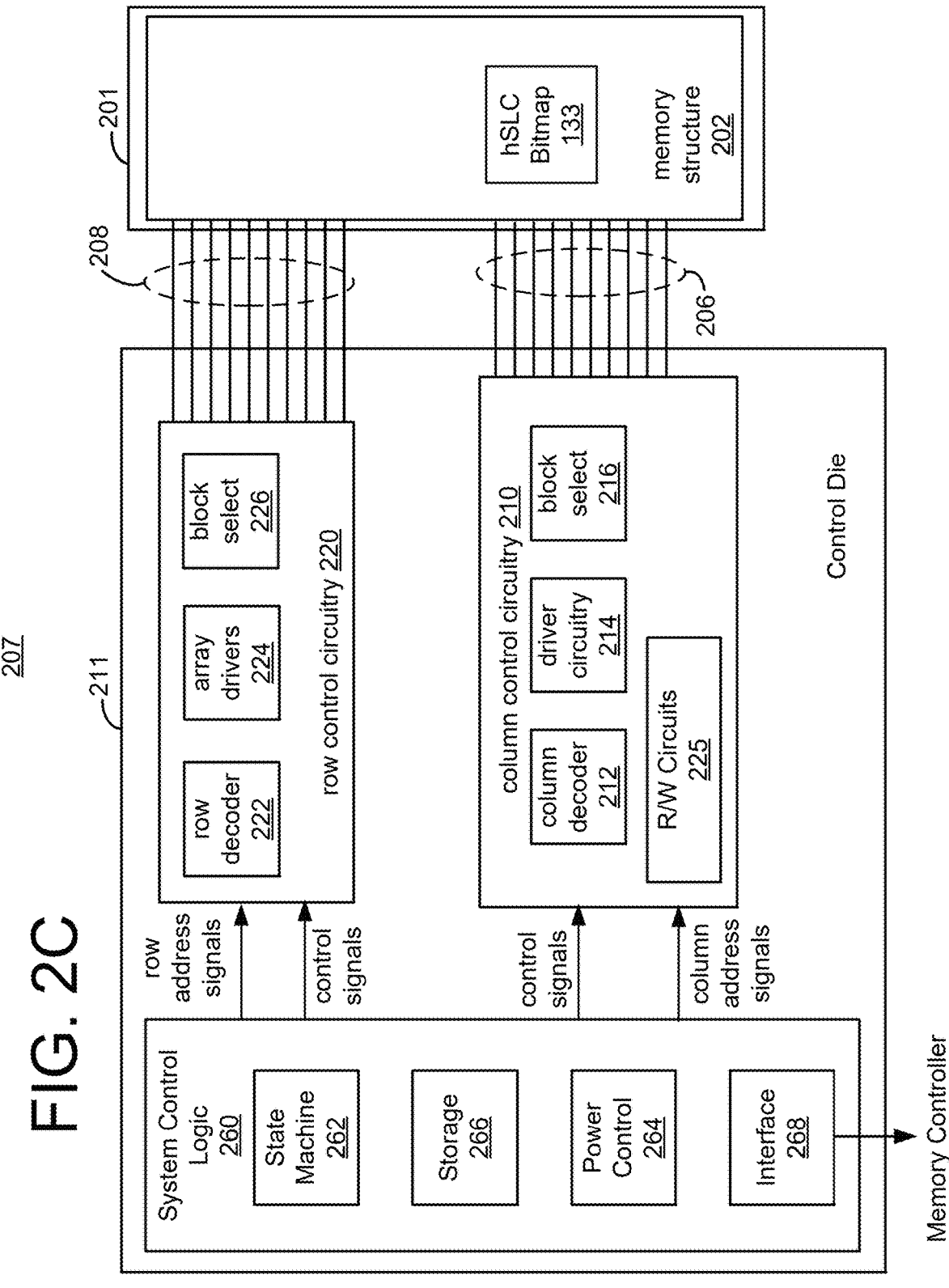
FIG. 2C is a block diagram of one embodiment of an integrated memory assembly.

FIG. 2C shows an alternative arrangement to that of FIG. 2B which may be implemented using wafer-to-wafer bonding to provide a bonded die pair. FIG. 2C depicts a functional block diagram of one embodiment of an integrated memory assembly 207. One or more integrated memory assemblies 207 may be used to implement the non-volatile storage 130 of memory system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2C shows an example of the peripheral circuitry, including control circuits, formed in a peripheral circuit or control die 211 coupled to memory structure 202 formed in memory structure die 201. Common components are labelled similarly to FIG. 2B. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2C shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, storage 130, memory die 200, integrated memory assembly 207, and/or control die 211.

Figures 3A, 3B:
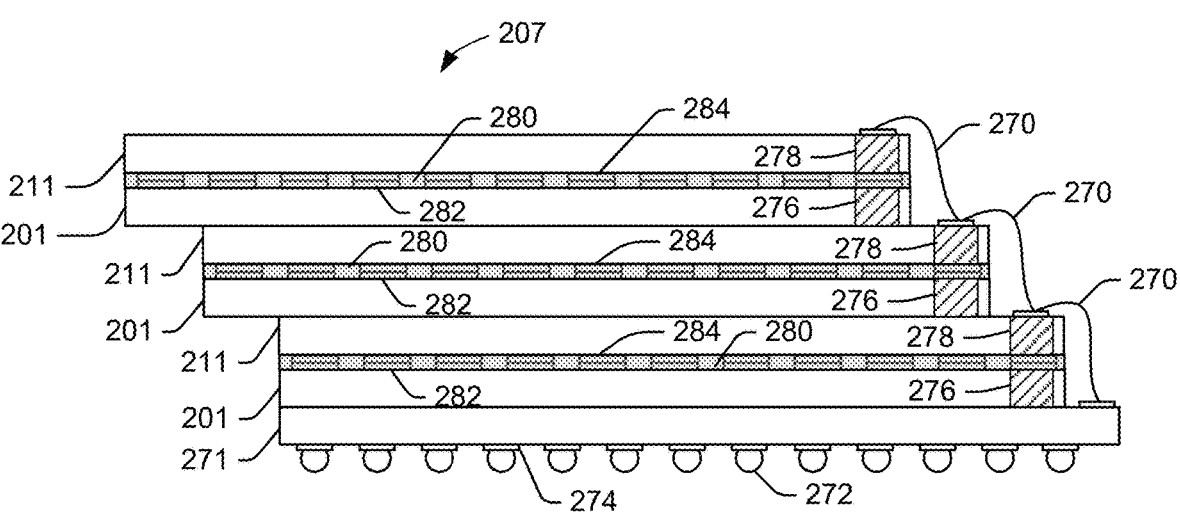
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 3C:
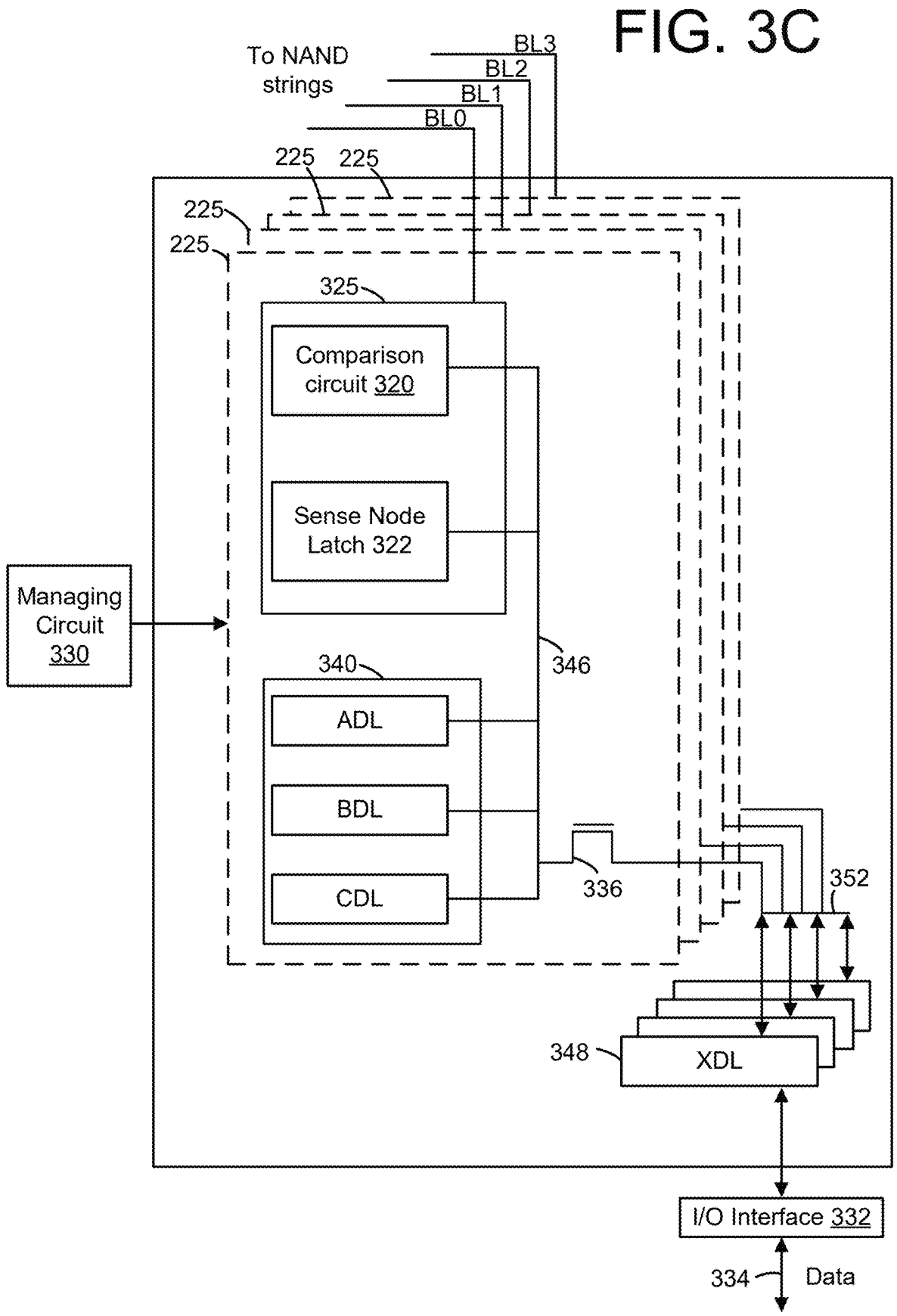
FIG. 3C is a block diagram depicting one embodiment of a portion of column control circuitry that contains a number of read/write circuits.

FIG. 3C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier. The following will discuss use of the sense amplifier 325 to sense a condition (e.g., data state) of a memory cell.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the program verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include three latches (ADL, BDL, CDL) for each sense amplifier 325 in this example. More or fewer than three latches may be included in the data latches 340. In one embodiment, for programming each data latch 340 is used to store one bit to be stored into a memory cell and for reading each data latch 340 is used to store one bit read from a memory cell. In a three bit per memory cell embodiment, ADL stores a bit for a lower page of data, BDL stores a bit for a middle page of data, CDL stores a bit for an upper page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 4:
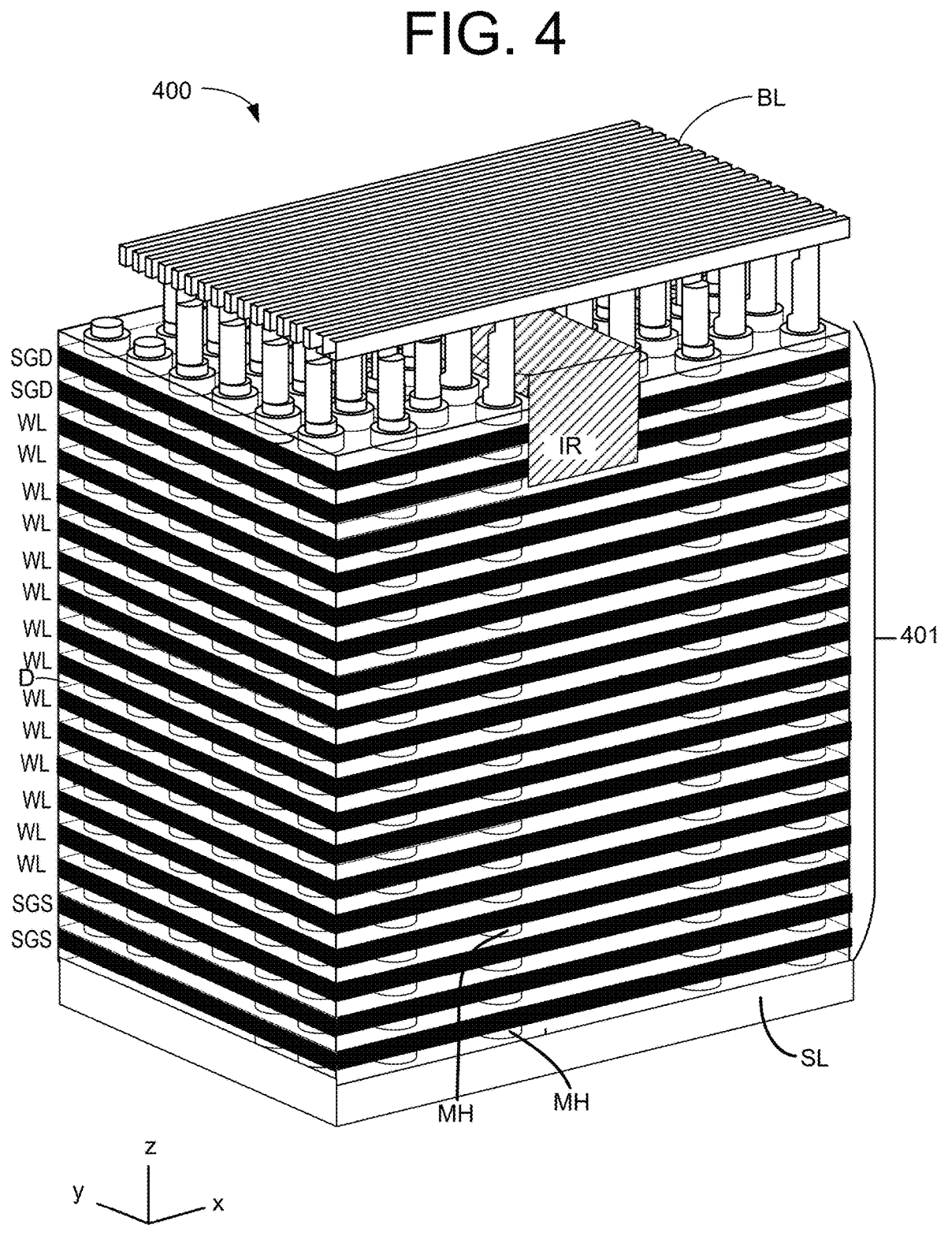

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D. The conductive layers are labeled as one of: SGD, WL, or SGS. An SGD conductive layer serves as drain side select lines. A WL conductive layer serves as a word line. An SGS conductive layer serves as a source side select line. The numbers of each of these conductive layers is limited for ease of illustration. The number of alternating dielectric layers and conductive layers can vary based on specific implementation requirements. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

In one embodiment the block is operated as a number of "sub-blocks." Each of these "sub-blocks" has many NAND strings. In an embodiment, an isolation region (IR) divides the SGD layers into multiple SGD select lines, each of which is used to select a sub-block (e.g., set of NAND strings). FIG. 4 depicts an example having one IR region and thereby two sub-blocks. However, there may be more than one IR region and thereby more than two sub-blocks. Optionally, the IR region can extend down through all of the alternating dielectric layers and conductive layers.

Figure 4A:
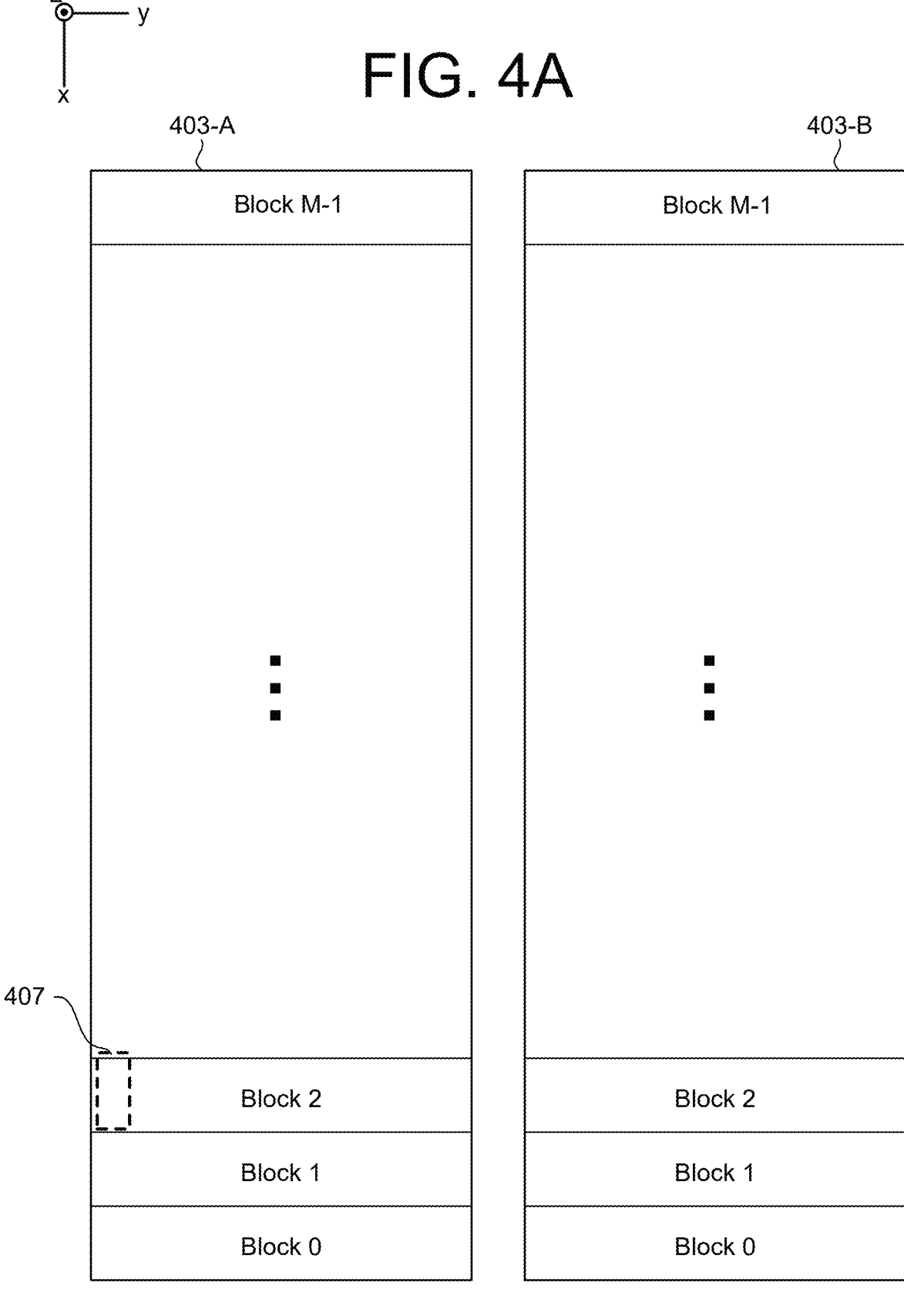
FIG. 4A is a block diagram of one embodiment of a memory structure having two planes.

FIG. 4A is a block diagram explaining one example organization of memory structure 202, which is divided into two planes 403-A and 403-B. Each plane 403 is then divided into M physical blocks. In one example, each plane has about 2000 physical blocks (or more briefly "blocks"). However, different numbers of blocks and planes can also be used. In one "full-block" embodiment, a block of memory cells is a unit of erase. That is, all memory cells of a block are erased together. In a "sub-block mode" embodiment, blocks are divided into sub-blocks and the sub-blocks are the unit of erase. In an embodiment, a block contains a number of word lines with each sub-block containing a unique set of the data word lines. In an embodiment, each plane 403-A, 403-B has a set of bit lines that extend across all of the blocks in that plane. In an embodiment, one block per plane is selected at a time. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403-A, 403-B more or fewer than two planes can be implemented. In some embodiments, memory structure 202 includes four planes. In some embodiments, memory structure 202 includes eight planes. In some embodiments, programming can be performed in parallel in a first selected block in plane 403-A and a second selected block in plane 403-B.

Figure 4B:
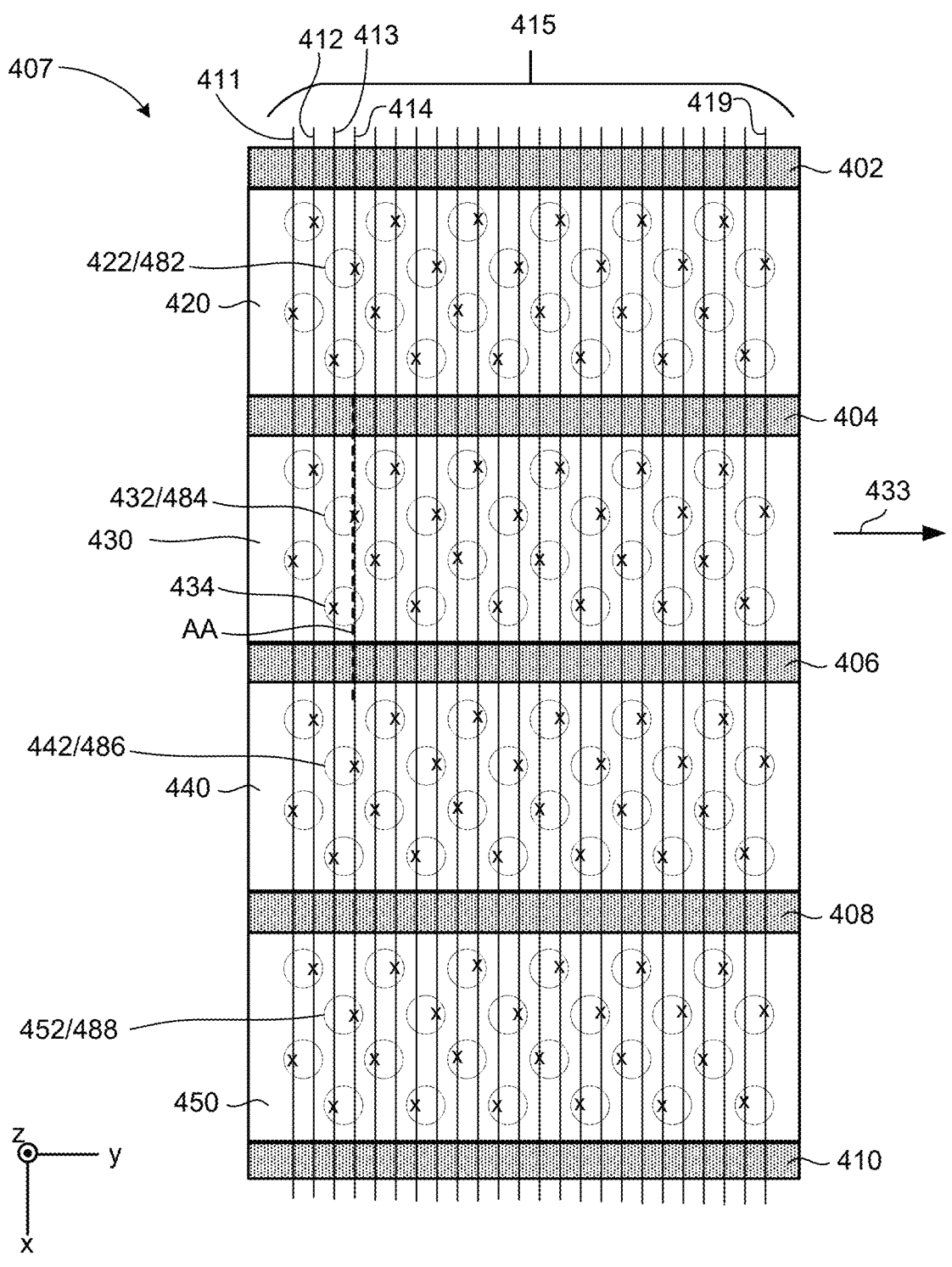
FIG. 4B is a block diagram depicting a top view of a portion of block of memory cells showing an array region.

FIGS. 4B-4E depict an example three dimensional ("3D") NAND structure that corresponds to the structure of FIG. 4 and can be used to implement memory structure 202 of FIGS. 2A and 2C. FIG. 4B is a diagram depicting a top view of a portion 407 of Block 2. As can be seen from FIG. 4B, the physical block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, and 452. Vertical column 422 implements NAND string 482. Vertical column 432 implements NAND string 484. Vertical column 442 implements NAND string 486. Vertical column 452 implements NAND string 488. More details of the vertical columns are provided below. Since the physical block depicted in FIG. 4B extends in the direction of arrow 433, the physical block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the physical block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The physical block depicted in FIG. 4B includes a set of isolation regions 402, 404, 406, 408, and 410, which are formed of $SiO_2$; however, other dielectric materials can also be used. Isolation regions 402, 404, 406, 408, and 410 serve to divide the top layers of the physical block into four regions; for example, the top layer depicted in FIG. 4B is divided into regions 420, 430, 440, and 450, which are referred to herein as "sub-blocks. Each string contains a large number of NAND strings. In one embodiment, isolation regions 402 and 410 separate the physical block 407 from adjacent physical blocks. Thus, isolation regions 402 and 410 may extend down to the substrate. In one embodiment, the isolation regions 404, 406, and 408 only divide the layers used to implement select gates so that NAND strings in different strings can be independently selected. Referring back to FIG. 4, the IR region may correspond to any of isolation regions 404, 406, or 408. In one example implementation, a bit line only connects to one vertical column/ NAND string in each of regions (sub-blocks) 420, 430, 440, and 450. In that implementation, each physical block has sixteen rows of active columns and each bit line connects to four NAND strings in each block. In one embodiment, all of the four vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B shows each region (420, 430, 440, 450) having four rows of vertical columns, four regions (420, 430, 440, 450) and sixteen rows of vertical columns in a block, those exact numbers are an example implementation. Other embodiments may include more or fewer regions (420, 430, 440, 450) per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
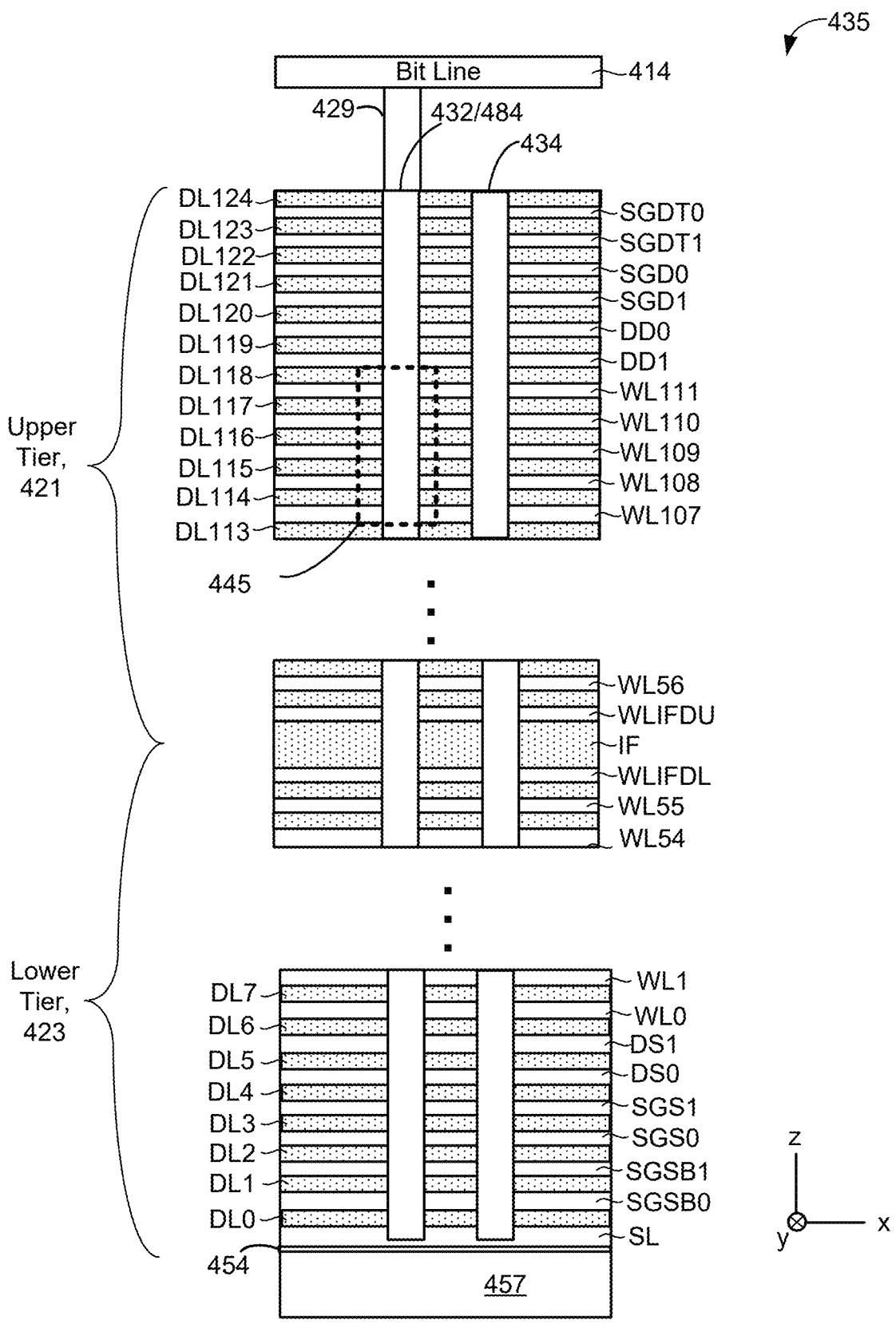
FIG. 4C depicts an example of a stack showing a cross-sectional view along line AA of FIG. 4B.

FIG. 4C depicts an example of a stack 435 showing a cross-sectional view along line AA of FIG. 4B. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Six dummy word line layers DD0, DD1, WLIFDU, WLIDDL, DS1, and DS0 are provided, in addition to the data word line layers WL0-WL111. There may be more or fewer than 112 data word line layers and more or fewer than six dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 429 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have the same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

FIG. 4C depicts an example of a stack 435 having two tiers (lower tier 423, upper tier 421). A two tier or other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole were etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the tiers are erased independent of one another. Hence, data may be maintained in the upper tier 421 after the lower tier 423 is erased. Likewise, data may be maintained in the lower tier 423 after upper tier 421 is erased.

Figure 4D:
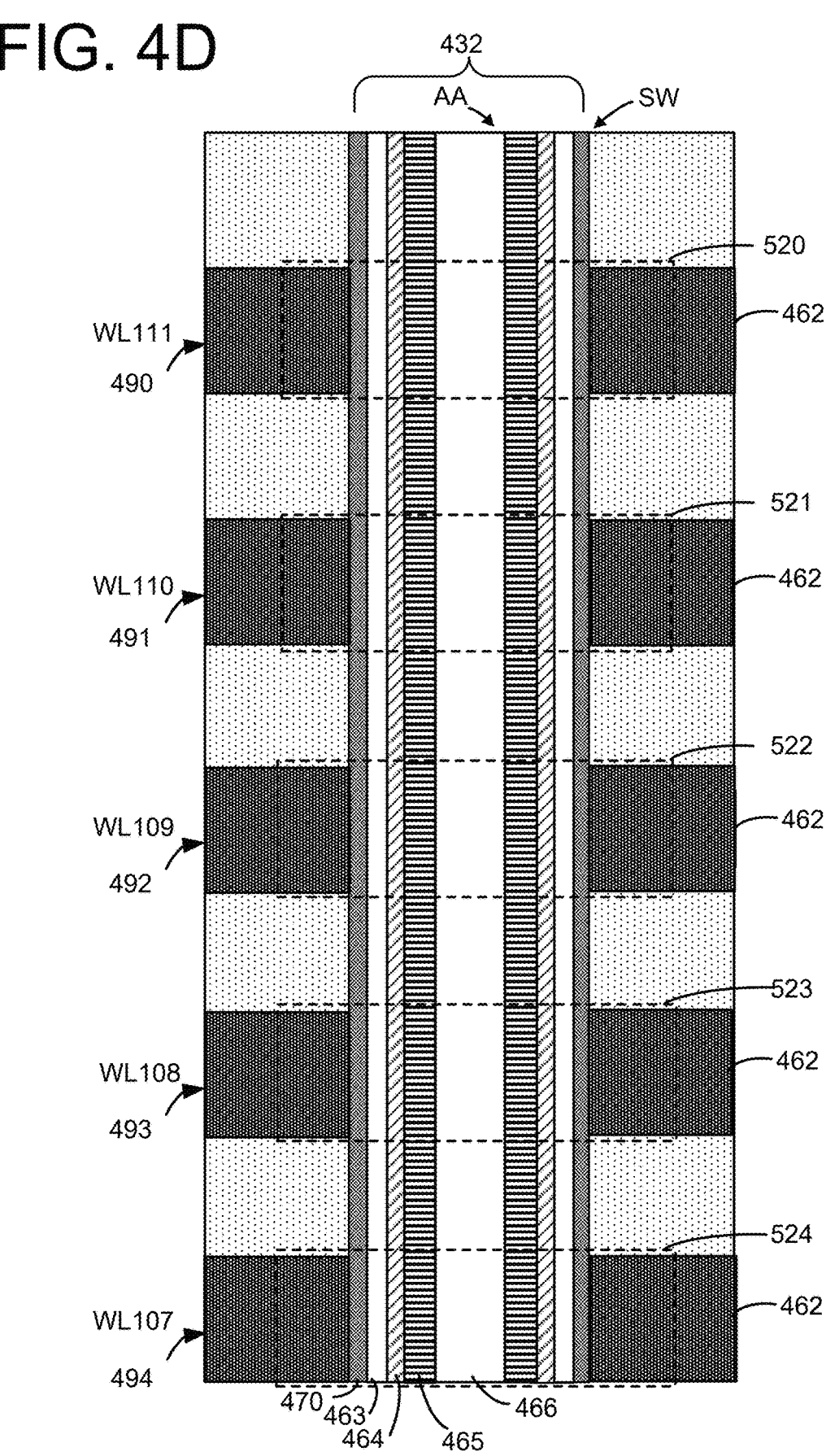
FIG. 4D depicts a view of the region 445 of FIG. 4C.

FIG. 4D depicts a view of the region 445 of FIG. 4C. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-K material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer that is associated with the data memory cell transistor. These electrons are drawn into the charge-trapping layer from the channel, and through the tunneling layer. The Vt of a data memory cell transistor is increased in proportion to the amount of stored charge. During an erase operation the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
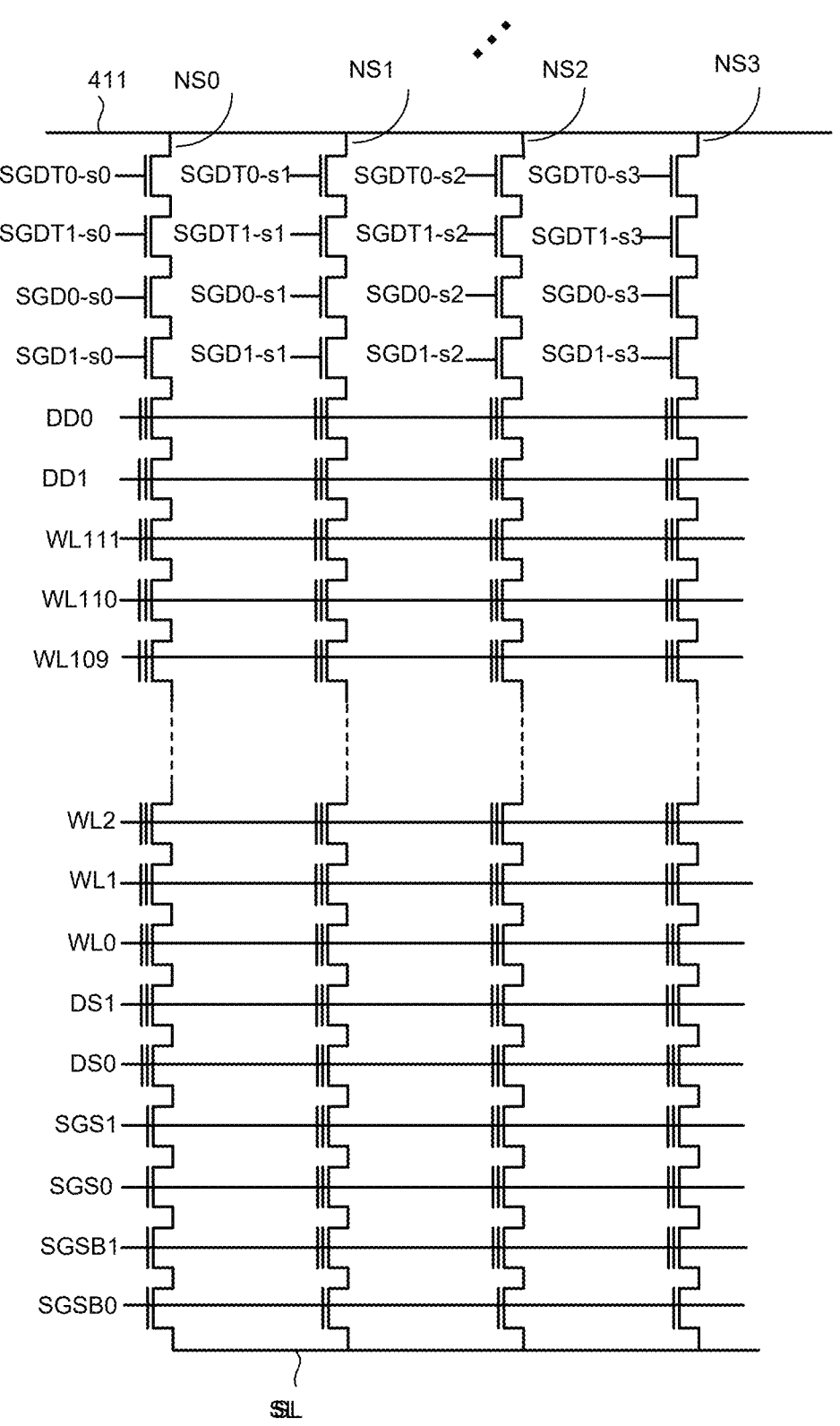
FIG. 4E is a schematic diagram of a portion of one embodiment of a block, depicting several NAND strings.

FIG. 4E is a schematic diagram of a portion of the memory array 202. FIG. 4E shows physical data word lines WL0-WL111 running across the entire block. The structure of FIG. 4E corresponds to a portion 407 in Block 2 of FIG. 4A, including bit line 411. Within the physical block, in one embodiment, each bit line is connected to four NAND strings. Thus, FIG. 4E shows bit line 411 connected to NAND string NS0, NAND string NS1, NAND string NS2, and NAND string NS3.

In one embodiment, there are four sets of drain side select lines in the physical block. For example, the set of drain side select lines connected to NS0 include SGDT0-$s0$, SGDT1-$s0$, SGD0-$s0$, and SGD1-$s0$. The set of drain side select lines connected to NS1 include SGDT0-$s1$, SGDT1-$s1$, SGD0-$s1$, and SGD1-$s1$. The set of drain side select lines connected to NS2 include SGDT0-$s2$, SGDT1-$s2$, SGD0-$s2$, and SGD1-$s2$. The set of drain side select lines connected to NS3 include SGDT0-$s3$, SGDT1-$s3$, SGD0-$s3$, and SGD1-$s3$. Herein the term "SGD" may be used as a general term to refer to any one or more of the lines in a set of drain side select lines. In some embodiments, the same operating voltage is applied to SGDT0 and SGDT1. In some embodiments, the same operating voltage is applied to SGD0 and SGD1. In some erase embodiments, different operating voltage are applied to SGDT0/SGDT1 than to SGD0/SGD1. Note that SGDT0/SGDT1 are adjacent to the bit line. In some erase embodiments, a voltage applied to SGDT0/SGDT1 in combination with a bit line voltage may be used to generate a gate induced gate leakage (GIDL) current. Such a voltage applied to SGDT0/SGDT1 may be referred to herein as a GIDL voltage.

In an embodiment, each line in a given set may be operated independent from the other lines in that set to allow for different voltages to the gates of the four drain side select transistors on the NAND string. Moreover, each set of drain side select lines can be selected independent of the other sets. Each set drain side select lines connects to a group of NAND strings in the block. Only one NAND string of each group is depicted in FIG. 4E. These four sets of drain side select lines correspond to four "sub-blocks." A first sub-block corresponds to those vertical NAND strings controlled by SGDT0-s0, SGDT1-s0, SGD0-s0, and SGD1-s0. A second sub-block corresponds to those vertical NAND strings controlled by SGDT0-s1, SGDT1-s1, SGD0-s1, and SGD1-s1. A third sub-block corresponds to those vertical NAND strings controlled by SGDT0-s2, SGDT1-s2, SGD0-s2, and SGD1-s2. A fourth sub-block corresponds to those vertical NAND strings controlled by SGDT0-s3, SGDT1-s3, SGD0-s3, and SGD1-s3. As noted, FIG. 4E only shows the NAND strings connected to bit line 411. However, a full schematic of the block would show every bit line and four vertical NAND strings connected to each bit line.

Although the example memories of FIGS. 4-4E are three dimensional memory structure that includes vertical NAND strings with charge-trapping material, other 3D memory structures can also be used with the technology described herein.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Programming memory cells to a single bit per cell is referred to as SLC programming. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing a sense operation) whether the threshold voltage of a given memory cell is above or below Vr, the system can determine whether a memory cell is erased (state E) or programmed (state P). FIG. 5A also depicts verify reference voltage Vv. In some embodiments, when programming memory cells to data state P, the system will test whether those memory cells have a threshold voltage greater than or equal to Vv. In some embodiments, when programming memory cells to data state P, the system will skip the verification. In an embodiment of SLC programming, the memory system will apply a single voltage pulse without any program verification. In an embodiment, the memory system will determine whether to verify or to skip verification based on the MLC programming speed of the group undergoing SLC programming.

FIG. 5B depicts an example in which it takes two programming pulses to program cells from the erase state to the programmed state. The first program pulse moves the Vts from the E distribution to the P' distribution. The second program pulse moves the Vts from the P' distribution to the P" distribution. If this example group of memory cells were to undergo programming with one pulse without verify then there is insufficient Vt gap between the E distribution and the P' distribution, which would lead to a high fail bit count.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. Programming memory cells to multiple bits of data per memory cell is referred to as MLC programming. In the example embodiment of FIG. 5C, each memory cell stores three bits of data. Other embodiments may use other data capacities per memory cell (e.g., such as two, four, or five bits of data per memory cell).

FIG. 5C shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5C shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5C also shows a number of verify reference voltages. The verify reference voltages are VvA, VvB, VvC, VvD, VvE, VvF, and VvG. In some embodiments, when programming memory cells to data state A, the system will test whether those memory cells have a threshold voltage greater than or equal to VvA. If the memory cell has a threshold voltage greater than or equal to VvA, then the memory cell is locked out from further programming. Similar procedures apply to the other data states.

Figure 6:
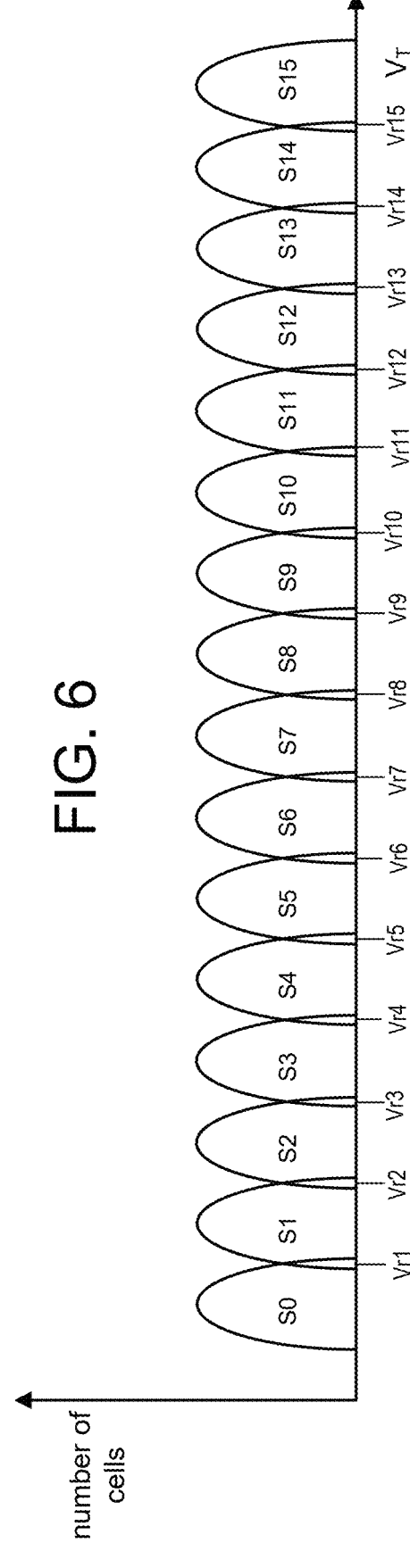

FIG. 6 illustrates example threshold voltage distributions for the memory array when each memory cell stores four bits of data. Other embodiments, however, may use other data capacities per memory cell (e.g., such as one, two, three, or five bits of data per memory cell). FIG. 6 shows 15 read reference voltages, Vr1-Vr15 for reading data from memory cells. The set of memory cells may be connected to the same word line. Each read reference level is used to distinguish between two adjacent threshold voltage distributions. Stated another way, each read reference level is used to distinguish between two adjacent data states. For example, read reference level Vr4 is used to distinguish between data states S3 and S4. Each read reference voltages Vr1-Vr15 used to distinguish between two adjacent threshold voltage distributions may be referred to herein as a "hard bit" reference voltage. By testing (e.g., performing sense operations) whether the threshold voltage of a given memory cell is above or below the 15 read reference voltages, the system can determine what data state (i.e., S0, S1, S2, S3 . . . ) a memory cell is in.

FIG. 6 depicts an example in which four bits are stored per memory cell. Thus, four pages of data may be stored in a set (e.g., page) of memory cells. The set of memory cells may be connected to the same word line. These data pages may be referred to as a lower page, lower-middle page, upper-middle page, and upper page. In one embodiment, in order to read the lower page, the memory cells are sensed using four different read reference voltages. For example, the memory cells may be sensed at Vr1, Vr4, Vr6, and Vr11 to read one of the pages.

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 7:
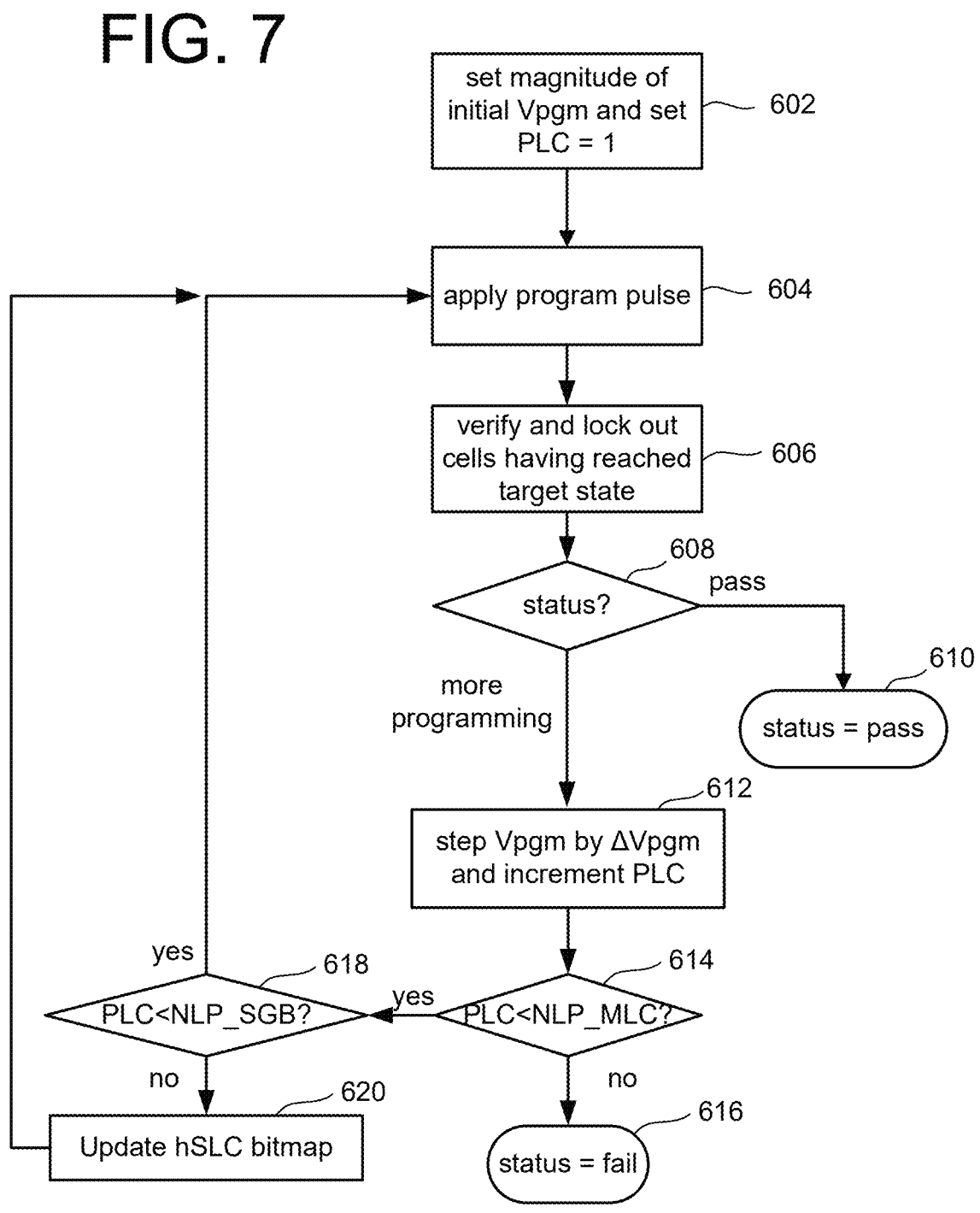
FIG. 7 is a flowchart describing one embodiment of a process for MLC programming memory cells.

FIG. 7 is a flowchart depicting one embodiment of MLC programming. For purposes of this document, the term program and programming are synonymous with write and writing. In one example embodiment, the process of FIG. 7 is performed for memory structure 202 using the one or more control circuits (e.g., system control logic 260, column control circuitry 210, row control circuitry 220) discussed above. The process includes multiple loops, each of which includes a program phase and a verify phase. The process of FIG. 7 may be performed in response to a command from the memory controller 120. The command may specify that MLC programming is to be performed. The command may also specify the address of the memory cells to be programmed. The process of FIG. 7 may be performed to implement a full sequence programming, as well as other programming schemes including multi-stage programming. When implementing multi-stage programming, the process of FIG. 7 is used to implement any/each stage of the multi-stage programming process.

Typically, the program voltage applied to the control gates (via a selected data word line) during a program operation is applied as a series of program pulses (e.g., voltage pulses). Between programming pulses a set of verify pulses (e.g., voltage pulses) may be used to perform verification. In many implementations, the magnitude of the program pulses is increased with each successive pulse by a predetermined step size. In step 602 of FIG. 7, the programming voltage signal (Vpgm) is initialized to the starting magnitude (e.g., ~12-16V or another suitable level) and a program loop counter PLC maintained by state machine 262 is initialized at 1. In one embodiment, the group of memory cells selected to be programmed (referred to herein as the selected memory cells) are programmed concurrently and are all connected to the same word line (the selected word line). The group of memory cells to be programmed may be referred to herein as a "physical page," "page of memory cells," or similar terminology. In one embodiment, the page of memory cells are connected to the same word line and in the same sub-block. There may be multiple pages of memory cells connected to the same word line.

In step 604, a program voltage pulse of the programming voltage signal Vpgm is applied to the selected word line (the word line selected for programming). If a memory cell on a NAND string should be programmed, then the corresponding bit line is biased at a program enable voltage. In step 604, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming. There will likely be other memory cells that are not selected for programming (unselected memory cells) that are also connected to the selected word line. The selected word line may also be connected to memory cells that are supposed to be inhibited from programming. For example, memory cells connected to the selected word line but in a different sub-block (e.g., different page) may be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, the control die may pre-charge channels of NAND strings that include memory cells connected to the selected word line that are to be inhibited from programming. NAND strings that include memory cells connected to the selected word line that are to be inhibited from programming may have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 606, program verify is performed and memory cells that have reached their target states are locked out from further programming by the control die. Step 606 includes performing verification of programming by sensing at one or more verify reference levels. In one embodiment, the verification process is performed by testing whether the threshold voltages of the memory cells selected for programming have reached the appropriate verify reference voltage. In step 606, a memory cell may be locked out after the memory cell has been verified (by a test of the Vt) that the memory cell has reached its target state. For example, a memory cell may be locked out if it reaches a verify reference voltage.

Step 608 includes a determination of whether programming is complete. If it is determined that all of the memory cells have reached their target threshold voltages (pass), the programming process is complete and successful because all selected memory cells were programmed and verified to their target states. A status of "PASS" is reported in step 610. In an embodiment, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state. In an embodiment, if it is determined whether the count is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 610. In this situation, enough memory cells programmed correctly such that the few remaining memory cells that have not been completely programmed can be corrected using ECC during the read process.

If it is determined in step 608 that additional programming is needed, then in step 612 the Program Loop Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts).

Then the programming process continues at step 614 and the program loop counter PLC is checked against the MLC program limit value (NLP_MLC). Examples of MLC program limit values include 6, 12, 16, 19, 20 and 30; however, other values can be used. If the program loop counter PLC is not less than the program limit value NLP_MLC, then the program process is considered to have failed and a status of FAIL is reported in step 616. If the program loop counter PLC is less than the MLC program limit value NLP_MLC, then the process continues at step 618. Step 618 is a comparison of the program loop counter PLC with an SLC guard band (NLP_SGB). The SLC guard band (NLP_SGB) is set to a lower number than the MLC program limit value NLP_MLC. The SLC guard band (NLP_SGB) is a criterion for identifying pages of memory cells that are slower for MLC programming. In an embodiment, pages whose MLC programming is slower than the criterion are identified as not eligible for SLC programming without verify. In an embodiment, only certain pages in the block are candidates for SLC programming without verify. Thus, step 618 may be selectively applied to only candidate pages in the block. Thus, if the page is not a candidate for SLC programming without verify step 618 may be skipped.

If the program loop counter PLC is not less than the SLC guard band (NLP_SGB) then step 620 is performed. Step 620 includes updating the hSLC bitmap 133. The hSLC bitmap will be updated such that this page of memory cells is marked as ineligible for SLC programming without verify. If the program loop counter PLC is not less than the SLC guard band (NLP_SGB) then step 620 is performed. After step 620, the process loops back to step 604 and another program pulse is applied to the selected word line so that another iteration of the programming process of FIG. 7 is performed. If the program loop counter PLC is less than the SLC guard band (NLP_SGB), then another program pulse is applied to the selected word line so that another iteration of the programming process of FIG. 7 is performed.

Figure 8:
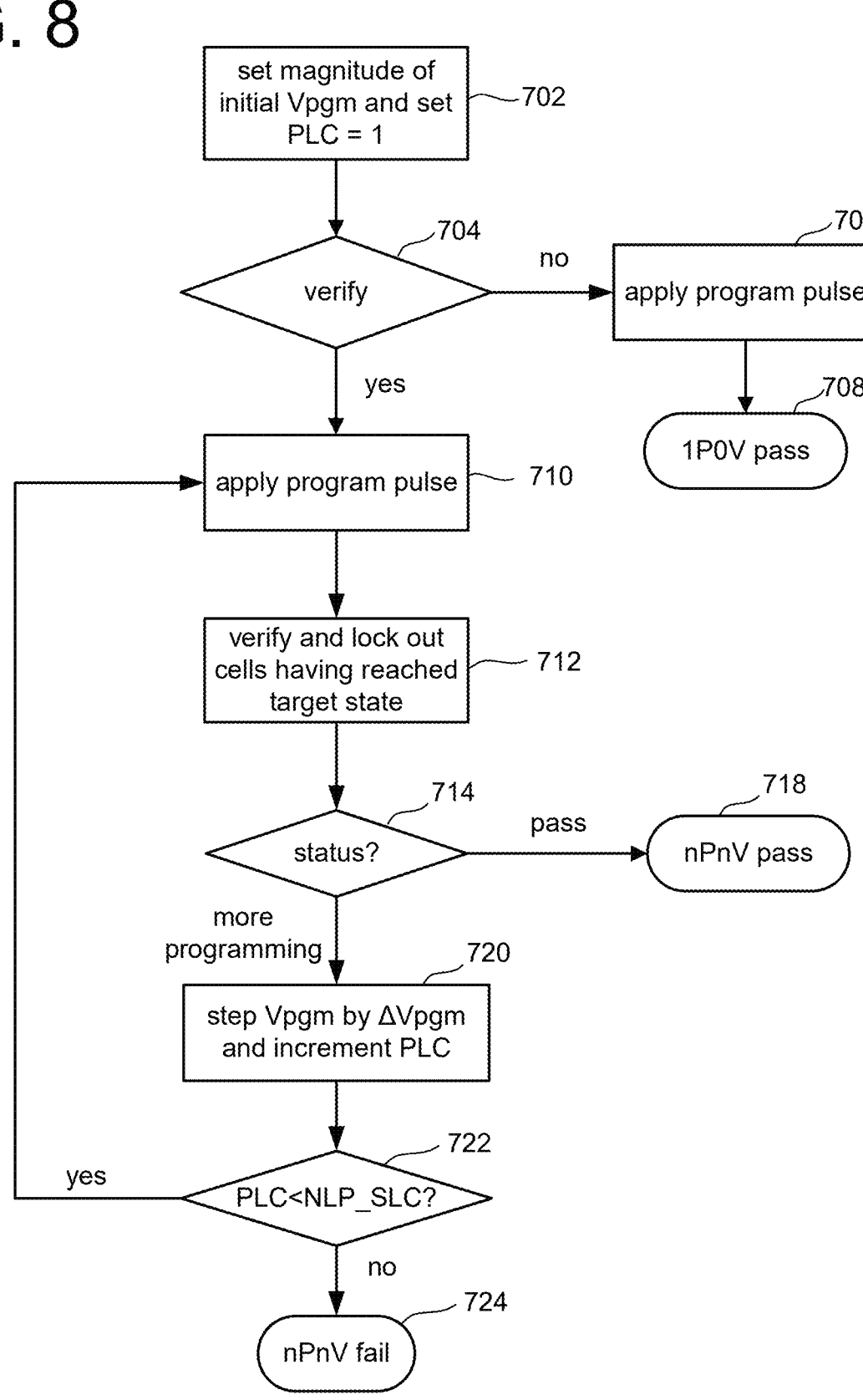
FIG. 8 is a flowchart depicting one embodiment of SLC programming.

FIG. 8 is a flowchart depicting one embodiment of SLC programming. In one example embodiment, the process of FIG. 8 is performed for memory structure 202 using the one or more control circuits (e.g., system control logic 260, column control circuitry 210, row control circuitry 220) discussed above. The process of FIG. 8 may be performed in response to a command from the memory controller 120. The command may specify that SLC programming is to be performed. The command may also specify the address of the memory cells to be programmed. Furthermore, the command may also specify whether verify is to be performed.

In step 702 of FIG. 7, the programming voltage signal (Vpgm) is initialized to the starting magnitude (e.g., ~12-16V or another suitable level) and a program loop counter PLC maintained by state machine 262 is initialized at 1.

Step 704 includes a determination of whether the verification should be performed. In an embodiment, the memory controller 120 maintains an hSLC bitmap 133 that contains a bit value for each page that is a candidate for SLC programming without verify. As an example, the bit value may be set to "1" to record that the page is to be SLC programmed with verify and "0" to record that the page is to be SLC programmed without verify. The SLC program command sent from the memory controller 120 to the die (200, 211) may specify whether this page is to be programmed with or without verify. Thus, step 704 may include the control logic 120 on the die (200, 211) responding to the program command sent from the memory controller 120. As an alternative, a copy of the hSLC bitmap 133 may be accessed by the control logic 120 on the die (200, 211) such that the control logic 120 on the die (200, 211) may read the hSLC bitmap 133. As an example, a copy of the hSLC bitmap 133 may be loaded into storage 266 for faster access.

If it is determined in step 704 that verify is not to be performed, then step 706 is performed. Step 706 includes applying a program pulse to the selected word line. If a memory cell on a NAND string should be programmed, then the corresponding bit line is biased at a program enable voltage. In step 706, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming. There will likely be other memory cells that are not selected for programming (unselected memory cells) that are also connected to the selected word line. The selected word line may also be connected to memory cells that are supposed to be inhibited from programming. For example, memory cells connected to the selected word line but in a different sub-block (e.g., different page) may be inhibited from programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, the die (200, 211) may pre-charge channels of NAND strings that include memory cells connected to the selected word line that are to be inhibited from programming. NAND strings that include memory cells connected to the selected word line that are to be inhibited from programming may have their channels boosted to inhibit programming. In one embodiment, the unselected word lines receive one or more boosting voltages (e.g., ~7-11 volts) to perform boosting schemes. A program inhibit voltage is applied to the bit lines coupled the unselected NAND string.

Step 708 includes reporting a program status of 1P0V (one program pulse, zero verify pulses) pass. That is, the no verify SLC programming is assumed to pass with one program pulse. If the memory system had not tested whether this page of memory cells was safe for SLC programming without verify then the cells could be under-programmed (similar to the P' distribution in FIG. 5B). However, the memory system has previously determined that this group of memory cells is safe for SLC programming. In an embodiment, the default condition for a candidate page is to not allow SLC programming without verify until the MLC programming speed has been tested.

If it was determined in step 704 that verify is to be performed, then the process continues at step 710 (instead of step 706). Step 710 includes applying a program pulse to the selected word line. If a memory cell on a NAND string should be programmed, then the corresponding bit line is biased at a program enable voltage. In step 710, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming. There will likely be other memory cells that are not selected for programming (unselected memory cells) that are also connected to the selected word line. The selected word line may also be connected to memory cells that are supposed to be inhibited from programming. For example, memory cells connected to the selected word line but in a different sub-block may be inhibited from programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, the die (200, 211) may pre-charge channels of NAND strings that include memory cells connected to the selected word line that are to be inhibited from programming. NAND strings that include memory cells connected to the selected word line that are to be inhibited from programming may have their channels boosted to inhibit programming. In one embodiment, the unselected word lines receive one or more boosting voltages (e.g., ~7-11 volts) to perform boosting schemes. A program inhibit voltage is applied to the bit lines coupled the unselected NAND string.

In step 712, program verify is performed and memory cells that have reached their target states are locked out from further programming by the die (200, 211). Step 712 includes performing verification of programming by sensing the Vv reference level (see FIG. 5A). In step 712, a memory cell may be locked out after the memory cell has been verified (by a test of the Vt) that the memory cell has reached its target state.

Step 714 includes a determination of whether programming is complete. If it is determined that all of the memory cells have reached their target threshold voltages (pass), the programming process is complete and successful because all selected memory cells were programmed and verified to their target states. A status of "nPnV PASS" is reported in step 718. In an embodiment, the number of memory cells that have not yet reached their respective target threshold voltage distribution are counted. That is, the number of memory cells that have, so far, failed to reach their target state are counted. This counting can be done by state machine 262, memory controller 120, or another circuit. In an embodiment, if it is determined whether the count is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "nPnV pass" is reported in step 718. In this situation, enough memory cells programmed correctly such that the few remaining memory cells that have not been completely programmed can be corrected using ECC during the read process.

If it is determined in step 714 that additional programming is needed, then in step 720 the Program Loop Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts).

Then the programming process continues at step 722 and the program loop counter PLC is checked against the SLC program limit value (NLP_SLC). The SLC program limit value is typically lower than the MLC program limit value. If the program loop counter PLC is not less than the SLC program limit value NLP_SLC, then the program process is considered to have failed and a status of nPnV fail is reported in step 724. If the program loop counter PLC is less than the SLC program limit value NLP_SLC, the process loops back to step 704 and another program pulse is applied to the selected word line so that another iteration of the programming process of FIG. 8 is performed.

In some embodiments, the pages of memory cells that are candidates for SLC programming are those with a low risk of SLC programming failing without program verify. In some embodiments, the storage system 100 maintains a dynamic list of pages that indicates whether each candidate page is to be verified if selected for SLC programming. This dynamic list may be maintained on a block-by-block basis. Each page on this dynamic list may have a block address and a page address. The hSLC bitmap 133 is one embodiment of a dynamic list of pages that indicates whether each candidate page is to be verified if selected for SLC programming. In addition, the memory system may have a static list of page addresses that are not candidates for SLC programming without verify. This static list may apply to all blocks in the memory structure 202.

FIG. 9 is a table showing an example of relative fail bit counts for the pages in a block assuming SLC programming is performed without verify. Column 902 contains the same example word line as are in column 2 in FIG. 1. An example of the relative fail bit counts for the pages are indicated in columns 904, 906, 908, 910 by the letters "H" for high, "M" for medium, and "L" for low. These relative fail bit counts are for purpose of example and will vary depending on the physical characteristics of the memory structure. The fail bit count may depend on the location of the page within the block. As an example, pages at the top of the stack, pages at the bottom of the stack, and pages near the joint between tiers may have relatively high fail bit counts assuming SLC programming is performed without verify. However, even pages at mid-tier could have at least a medium fail bit count.

The conventional technique in FIG. 1 may place at least some of the pages having higher fail bit counts into the category that does not permit SLC program without verify. However, some of the pages that are not permitted to have SLC program without verify may in fact have sufficiently low fail bit counts to permit SLC program without verify. Unnecessary SLC verify will slow programming speed and increase current/power consumption. Furthermore, some of the pages for which SLC program without verify is permitted may have relatively high fail bit counts, which may lead to a page fail. Moreover, the conventional technique in FIG. 1 treats all blocks the same. However, there can be block-by-block variations in the SLC programming characteristics of the pages. Therefore, permitting SLC program without verify for a certain page address may work well for most blocks; however, SLC program without verify for that certain page address may have an unacceptable fail bit count for other blocks. An embodiment of a memory system with hybrid block management for dynamic SLC verify identifies the candidate pages that benefit from program verify when SLC programming and avoids unnecessary program verify when SLC programming the candidate pages. An embodiment of a memory system with hybrid block management for dynamic SLC verify accounts for block-to-block variations in the SLC programming of the candidate pages.

FIG. 10 is a flowchart of one embodiment of a process 1000 of operating three-dimensional NAND memory. Process 1000 operates on a "set of candidate pages." These candidate pages may be restricted to pages within blocks that are in a pool of blocks eligible for both MLC programming and SLC programming (e.g., hybrid blocks). Moreover, the candidate pages may be restricted to those that are candidates for SLC programming without program verify. In one embodiment, pages that are on a static list of pages for which SLC programming without program verify is not allowed are not eligible to be a candidate page.

Step 1002 includes setting default values for candidate page eligibility for SLC programming without verify. Step 1002 may include setting default values in the hSLC bitmap 133. In one embodiment, the default value is to permit SLC programming without verify. Thus, if the value "0" is to permit SLC programming without verify then all entries in the hSLC bitmap 133 may initially be set to 0. However, this is only one example of setting default values in the hSLC bitmap 133 and other schemes may be used.

Step 1004 includes tracking MLC programming speed of a set of candidate pages of memory cells. In an embodiment, the storage system 100 tracks on a block-by-block basis. Each candidate page may have a block address and a page address. Step 1004 may include counting how many program pulses are needed to complete MLC programming. The tracking of the MLC programming speed may take place during the MLC programming of FIG. 7. For example, the program loop counter (PLC) may be used to track the MLC programming speed.

Step 1006 includes determining whether each respective candidate page is eligible for SLC programming without program verify based on the MLC programming speed. Step 1004 may include updating the hSLC bitmap 133. Step 1006 may include setting a bit in the hSLC bitmap 133 responsive to a candidate page failing to meet an MLC programming speed criterion, such as completing MLC programming within a loop count limit (e.g., NLP_SGB). As an example the bit that corresponds to this candidate page may be set to "1" to indicate that it is not eligible for SLC programming without verify because the candidate page failed to meet the MLC programming speed criterion. Steps 618 and 620 in FIG. 7 is performed in one embodiment of step 1006. In one embodiment, once a candidate page has failed to meet the MLC programming speed criterion it will remain ineligible for SLC programming within verify regardless of future results for MLC programming speed. However, in an embodiment, a candidate page could again become eligible for SLC programming without verify if the MLC programming speed shows sufficient improvement.

Step 1008 includes programming the candidate pages based on the determination. In one embodiment, the memory system consults the hSLC bitmap 133 to determine whether a candidate page should be verified during SLC programming. FIG. 11 provides further details of one such block SLC programming embodiment. In one embodiment, the memory system consults the hSLC bitmap 133 to determine whether a block should be moved from a pool of hybrid blocks to a pool of MLC only blocks. FIG. 12 provides further details of one such block management embodiment.

FIG. 11 is a flowchart of one embodiment of a process 1100 of SLC programming wherein program verify depends on MLC programming speed. Process 1100 is one embodiment of step 1008 in FIG. 10. Step 1102 includes selecting a hybrid block for SLC programming. This hybrid block has pages that are candidates for SLC programming without verify. It is possible, though not required, that the hybrid block has pages that are not candidates for SLC programming without verify. The SLC verify treatment for the candidate pages may be specified by the hSLC bitmap 133. Optionally, a static list of page addresses may be used to specify those pages that are to always be verified for SLC programming and are thus not candidates for SLC programming without verify.

Step 1104 include programming candidate pages of memory cells in the hybrid block that are faster for MLC programming to a single bit per cell without program verify. Step 1104 may be performed in response to a determination that these pages are specified by the hSLC bitmap 133 as eligible for SLC programming without verify. Steps 706 and 708 of the process in FIG. 8 may be performed in an embodiment of step 1102.

Step 1106 include programming pages of memory cells in the hybrid block that are slower for MLC programming to a single bit per cell with program verify. Step 1106 may be performed in response to a determination that these pages are specified by the hSLC bitmap 133 as ineligible for SLC programming without verify. Steps 710 to 722 of the process in FIG. 8 may be performed in an embodiment of step 1106. A passing result is reported if SLC programming passes (see step 718 in FIG. 8). In the event that the SLC programming fails then a failing result may be reported (see step 724 in FIG. 8).

Optional step 1108 includes programming any pages on the static list to a single bit per cell with program verify. Steps 710 to 722 of the process in FIG. 8 may be performed in an embodiment of step 1108. A passing result is reported if SLC programming passes (see step 718 in FIG. 8). In the event that the SLC programming fails then a failing result may be reported (see step 724 in FIG. 8).

FIG. 12 is a flowchart of one embodiment of a process 1200 of managing pools of blocks based on MLC programming speed. Process 1200 is one embodiment of step 1008 in FIG. 10. Step 1202 includes placing blocks having at least a threshold number of slow to MLC program candidate pages into a first pool of blocks that are eligible for MLC programming but are not eligible for SLC programming. In an embodiment, a criterion for slow to MLC program is taking more than a certain number of program pulses to complete MLC programming (see the process in FIG. 7 as an example). Note that any pages on the static list of pages that are not candidates for SLC programming without verify are excluded from this count of candidate pages that are slow to MLC program. Step 1202 thus includes moving a block from a pool of hybrid blocks to a pool of MLC programming only blocks. In an embodiment, the threshold number is one, such that if any of the candidate pages are slow to program the block is only used for SLC programming. However, the threshold number may be greater than one.

Step 1204 includes keeping hybrid blocks having less than the threshold number of slow to MLC program candidate pages in a second pool (e.g., hybrid pool) of blocks that are eligible for both MLC programming and SLC programming. The same criterion for slow to MLC program that was used in step 1202 is used in step 1204. As will step 1202, in step 1204 any pages on the static list of pages that are not candidates for SLC programming without verify are excluded from this count of candidate pages that are slow to MLC program. Step 1204 thus may include keeping the block in the pool of hybrid blocks FIG. 13 is a flowchart of one embodiment of a process 1300 of operating NAND memory. The process 1300 provides further details of an embodiment of process 1000. Step 1302 includes maintaining a pool of hybrid blocks that are eligible for SLC programming and MLC programming. This pool may be maintained by the memory controller 120. Step 1304 includes tracking MLC programming speed for candidate groups (e.g., candidate pages) of memory cells in the hybrid blocks that are candidates for SLC programming without program verify. An example of tracking MLC programming speed was discussed in step 1004 of process 1000.

Step 1306 includes selecting a hybrid block from the pool for SLC programming. Step 1308 includes programming the candidates groups in the selected hybrid block that completed MLC programming in more than the pre-determined number of program loops to a single bit per memory cell with program verify. Step 1310 includes programming the candidates groups in the selected hybrid block that completed MLC programming within the pre-determined number of program loops to a single bit per memory cell without program verify.

In view of the foregoing, an embodiment includes an apparatus comprising one or more control circuits configured to connect to a three-dimensional NAND memory structure. The NAND memory structure is organized into pages of NAND memory cells. The one or more control circuits are configured to track multi-level cell (MLC) programming speed of candidate pages in the three-dimensional NAND memory structure. The candidate pages are candidates for single-level cell (SLC) programming without program verify. The one or more control circuits are configured to determine whether individual candidate pages are eligible for single-level cell (SLC) programming without program verify based on the MLC programming speed. The one or more control circuits are configured to program the candidate pages based on the determination.

In a further embodiment of the apparatus, programming the candidate pages based on the determination includes the one or more control circuits: programming the candidate pages having MLC programming speed that meet a speed criterion to a single bit per memory cell without program verify; and programming the candidate pages having MLC programming speed that does not meet the speed criterion to a single bit per memory bit with program verify.

In a further embodiment of the apparatus, tracking multilevel cell (MLC) programming speed of the candidate pages includes tracking which candidate pages complete MLC programming within a pre-determined number of program pulses and which candidate pages complete MLC programming in more than the pre-determined number of program pulses. Also, programming candidate pages based on the determination includes programming the candidate pages that complete MLC programming within the pre-determined number of program pulses to a single bit per memory cell without program verify, and programming the candidate pages that complete MLC programming in more than the pre-determined number of program pulses to a single bit per memory cell with program verify.

In a further embodiment of the apparatus the NAND memory structure is further organized into blocks of NAND memory cells, with each block comprising a plurality of the candidate pages. The one or more control circuits are further configured to place blocks having at least a threshold number of the candidate pages that complete MLC programming with more than a pre-determined number of program pulses into a first pool of blocks that are eligible for MLC programming but are not eligible for SLC programming. The one or more control circuits are further configured to place blocks having less than the threshold number of candidate pages that complete MLC programming with more than the pre-determined number of program pulses into a second pool of blocks that are eligible for MLC programming and are also eligible for SLC programming.

In a further embodiment of the apparatus the one or more control circuits are further configured to select: a block in the second pool for SLC programming; program the candidate pages in the selected block that completed MLC programming with more than the pre-determined number of program pulses to single bit per memory cell with program verify; and program the candidate pages in the selected block that completed MLC programming within the pre-determined number of program pulses to single bit per memory cell without program verify.

In a further embodiment of the apparatus the one or more control circuits are further configured to maintain a dynamic list of the candidate pages that identifies a first set of the candidate pages that are slower than an MLC programming speed criterion to program to multiple bits per memory cell and a second set of the candidate pages that are at least as fast as the MLC programming speed criterion to program to the multiple bits per memory cell.

In a further embodiment of the apparatus the NAND memory structure is further organized into blocks of NAND memory cells with each block comprising a plurality of the candidate pages. The candidate pages for each block share a common set of page addresses. The one or more control circuits are further configured to maintain a static list of the page addresses for which verify is always programmed for SLC programming.

In a further embodiment of the apparatus the dynamic list identifies block addresses and page addresses that are candidates for SLC programming without program verify. The dynamic list does not contain any of the page addresses on the static list.

In a further embodiment of the apparatus the NAND memory structure is further organized into blocks with each block comprising a plurality of the candidate pages. Each block comprises a plurality of NAND strings and plurality of word lines associated with the NAND strings in the block. Each candidate page comprises a group of memory cells connected to the same word line. More than one of the candidate pages is connected to the same word line.

An embodiment includes a method for operating NAND memory. The method comprises programming a block of NAND memory cells to multiple bits per memory cell group by group, including tracking which candidate groups take more than a pre-determined number of program pulses to complete programming. Each candidate group is a candidate for programming to a single bit per cell without verify. The method comprises programming the block of the NAND memory cells to a single bit per memory cell group by group, including: applying one or more program pulses followed by a program verify for each of the one or more program pulses for those candidate groups that took more than the pre-determined number of program pulses to complete programming to multiple bits per memory cell; and applying a single program pulse without any program verify for those candidate groups that completed programming to multiple bits per cell within the pre-determined number of program pulses.

An embodiment includes a non-volatile memory system, comprising a plurality of three-dimensional blocks comprising NAND strings and word line associated with the NAND strings. The non-volatile memory system comprises one or more control circuits in communication with the plurality of three-dimensional blocks. The one or more control circuits are configured to maintain a pool of hybrid blocks that are eligible for multi-level cell (MLC) programming and single-level cell (SLC) programming. The one or more control circuits are configured to track MLC programming speed for candidate groups of memory cells in the hybrid blocks that are candidates for SLC programming without program verify. The one or more control circuits are configured to select a hybrid block from the pool for SLC programming. The one or more control circuits are configured to program the candidate groups in the selected hybrid block that completed MLC programming slower than a criterion to a single bit per memory cell with program verify. The one or more control circuits are configured to program the candidates groups in the selected hybrid block that completed MLC programming at least as fast as the criterion to a single bit per memory cell without program verify.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   one or more control circuits configured to connect to a three-dimensional NAND memory structure, the NAND memory structure organized into pages of NAND memory cells, the one or more control circuits configured to:
   track multi-level cell (MLC) programming speed of candidate pages in the three-dimensional NAND memory structure, the candidate pages being candidates for single-level cell (SLC) programming without program verify;
   maintain a dynamic list of the candidate pages that identifies a first set of the candidate pages that are slower than an MLC programming speed criterion to program to multiple bits per memory cell and a second set of the candidate pages that are at least as fast as the MLC programming speed criterion to program to the multiple bits per memory cell;
   determine, based on the dynamic list, whether individual candidate pages are eligible for single-level cell (SLC) programming without program verify based on the MLC programming speed; and
   program the candidate pages based on the determination.

2. The apparatus of claim 1, wherein programming the candidate pages based on the determination includes the one or more control circuits:
   programming the second set of the candidate pages having MLC programming speed that meet the MLC speed criterion to a single bit per memory cell without program verify; and
   programming the first set of the candidate pages having MLC programming speed that does not meet the MLC speed criterion to a single bit per memory bit with program verify.

3. The apparatus of claim 1, wherein:
   tracking multi-level cell (MLC) programming speed of the candidate pages includes tracking which candidate pages complete MLC programming within a pre-determined number of program pulses and which candidate pages complete MLC programming in more than the pre-determined number of program pulses;
   programming candidate pages based on the determination includes:
      programming the second set of the candidate pages that complete MLC programming within the pre-determined number of program pulses to a single bit per memory cell without program verify; and
      programming the first set of the candidate pages that complete MLC programming in more than the pre-determined number of program pulses to a single bit per memory cell with program verify.

4. The apparatus of claim 1, wherein:
   the NAND memory structure is further organized into blocks of NAND memory cells, each block comprises a plurality of the candidate pages; and
   the one or more control circuits are further configured to:
      place blocks having at least a threshold number of the candidate pages that complete MLC programming with more than a pre-determined number of program pulses into a first pool of blocks that are eligible for MLC programming but are not eligible for SLC programming; and place blocks having less than the threshold number of the candidate pages that complete MLC programming with more than the pre-determined number of program pulses into a second pool of blocks that are eligible for MLC programming and are also eligible for SLC programming.

5. The apparatus of claim 4, wherein the one or more control circuits are further configured to:

select a block in the second pool for SLC programming;

program the candidate pages in the selected block that completed MLC programming with more than the pre-determined number of program pulses to single bit per memory cell with program verify; and program the candidate pages in the selected block that completed MLC programming within the pre-determined number of program pulses to single bit per memory cell without program verify.

6. The apparatus of claim 1, wherein:

the NAND memory structure is further organized into blocks of NAND memory cells, each block comprises a plurality of the candidate pages, the candidate pages for each block share a common set of page addresses; and the one or more control circuits are further configured to maintain a static list of the page addresses for which verify is always programmed for SLC programming.

7. The apparatus of claim 6, wherein:

the dynamic list identifies block addresses and page addresses that are candidates for SLC programming without program verify; and the dynamic list does not contain any of the page addresses on the static list.

8. The apparatus of claim 1, wherein the NAND memory structure is further organized into blocks, each block comprises a plurality of the candidate pages, each block comprises a plurality of NAND strings and plurality of word lines associated with the NAND strings in the block, each candidate page comprises a group of memory cells connected to the same word line, more than one of the candidate pages is connected to the same word line.

9. A method for operating NAND memory, the method comprising:

programming a block of NAND memory cells to multiple bits per memory cell group by group, including tracking which candidate groups take more than a pre-determined number of program pulses to complete programming to multiple bits per memory, each candidate group being a candidate for programming to a single bit per cell without verify;

maintaining a dynamic list of candidate groups of NAND memory cells that comprises a first set of candidate groups that took more than the pre-determined number of program pulses to complete programming to multiple bits per memory cell and a second set of candidate groups that completed programming to multiple bits per memory cell within the pre-determined number of program pulses; and programming the block of the NAND memory cells to a single bit per memory cell group by group while applying different programming to the candidate groups of NAND memory cells on the dynamic list based on whether the respective candidate group is in the first set or the second set, including:

applying one or more program pulses followed by a program verify for each of the one or more program pulses for the first set of candidate groups that took more than the pre-determined number of program pulses to complete programming to multiple bits per memory cell; and applying a single program pulse without any program verify for the second set of candidate groups that completed programming to multiple bits per cell within the pre-determined number of program pulses.

10. The method of claim 9, wherein programming the block of the NAND memory cells to a single bit per memory cell group by group further includes:

applying one or more program pulses followed by a program verify for each of the one or more program pulses for any groups that are not candidates for programming to a single bit per cell without verify.

11. The method of claim 9, wherein each group of memory cells in a block has a different page address and different blocks share the same page addresses, and further comprising:

maintaining a static list of page addresses that are not eligible for programming to a single bit per cell without verify; and performing a program verify whenever programming a group having one of the page addresses on the static list to a single bit per cell.

12. The method of claim 9, further comprising:

placing blocks of the NAND memory cells having at least a threshold number of candidate groups that took more than the pre-determined number of program pulses to complete MLC programming into a first pool of blocks that are eligible for programming to multiple bits per memory cell but are not eligible for programming to a single bit per memory cell; and placing blocks of the NAND memory cells having less than the threshold number of candidate groups that took more than the pre-determined number of program pulses to complete MLC programming into a second pool of blocks that are eligible for programming to multiple bits per memory cell and are also eligible for programming to a single bit per memory cell.

13. The method of claim 12, further comprising:

selecting a block from the second pool of blocks;

programming the candidate groups of NAND memory cells in the selected block that took more than the pre-determined number of program pulses to complete MLC programming to a single bit per cell with program verify; and programming the candidate groups of NAND memory cells in the selected block completed MLC programming within the pre-determined number of program pulses to a single bit per cell without program verify.

14. A non-volatile memory system, comprising:

a plurality of three-dimensional blocks comprising NAND strings and word line associated with the NAND strings; and one or more control circuits in communication with the plurality of three-dimensional blocks, the one or more control circuits configured to:

maintain a pool of hybrid blocks that are eligible for multi-level cell (MLC) programming and single-level cell (SLC) programming;

track MLC programming speed for candidate groups of memory cells in the hybrid blocks that are candidates for SLC programming without program verify; and move blocks having more than a threshold number of candidate groups that completed MLC programming in more than a pre-determined number of program loops from the pool of hybrid blocks to a pool of MLC blocks that are eligible for MLC programming but are not eligible for SLC programming.

15. The non-volatile memory system of claim 14, wherein the one or more control circuits are further configured to:
select a hybrid block from the pool for SLC programming;
program the candidate groups in the selected hybrid block that completed MLC programming in more than the pre-determined number of program loops to a single bit per memory cell with program verify; and
program the candidate groups in the selected hybrid block that completed MLC programming within the pre-determined number of program loops to a single bit per memory cell without program verify.

16. The non-volatile memory system of claim 14, wherein:
each block in NAND memory structure comprises a plurality of a pages of memory cells, the pages for each block share a common set of page addresses; and
the one or more control circuits are further configured to maintain a static list of the page addresses that are ineligible for SLC programming without program verify, each candidate group has a block address and a page address that is not on the static list.

\* \* \* \* \*